US005539452A

United States Patent [19]
Bush et al.

[11] Patent Number: 5,539,452
[45] Date of Patent: *Jul. 23, 1996

[54] VIDEO TELEPHONE SYSTEM

[75] Inventors: Daniel R. Bush, Franktown; Ashok Patel, Castle Rock; Charlie W. Zetterower, Parker, all of Colo.

[73] Assignee: Alkanox Corporation, Evergreen, Colo.

[*] Notice: The term of this patent shall not extend beyond the expiration date of Pat. No. 5,164,980.

[21] Appl. No.: 301,893

[22] Filed: Sep. 6, 1994

Related U.S. Application Data

[63] Continuation of Ser. No. 628,607, Dec. 17, 1990, Pat. No. 5,347,305, which is a continuation-in-part of Ser. No. 482,649, Feb. 21, 1990, Pat. No. 5,164,980.

[51] Int. Cl.⁶ .................................................. H04N 7/14
[52] U.S. Cl. ................................................ 348/17; 348/14
[58] Field of Search .................................. 348/14, 17, 15, 348/16, 18; 379/96

[56] References Cited

U.S. PATENT DOCUMENTS

| | | | |
|---|---|---|---|
| 3,873,771 | 3/1975 | Kleinerman et al. | 179/2 |
| 4,099,202 | 7/1978 | Cavanaugh | 348/14 |
| 4,237,484 | 12/1980 | Brown et al. | 358/142 |
| 4,485,400 | 11/1984 | Lemelson et al. | 348/14 |
| 4,544,950 | 10/1985 | Tu | 358/143 |
| 4,593,318 | 6/1986 | Eng et al. | 358/142 |
| 4,715,059 | 12/1987 | Cooper-Hart et al. | 348/14 |
| 4,774,574 | 9/1988 | Daly et al. | 358/153 |
| 4,849,811 | 7/1989 | Kleinerman | 358/133 |
| 4,955,048 | 9/1990 | Iwamura et al. | 348/14 |
| 4,962,521 | 10/1990 | Kamatsu et al. | 379/53 |
| 4,985,911 | 1/1991 | Emmons et al. | 348/14 |
| 4,991,009 | 2/1991 | Suzuki et al. | 379/53 |
| 5,130,792 | 7/1992 | Tindell | 348/14 |
| 5,164,980 | 11/1992 | Bush et al. | 348/14 |

FOREIGN PATENT DOCUMENTS

| | | |
|---|---|---|
| 3640680 | 6/1988 | Germany . |
| 61-159883 | 7/1986 | Japan . |
| 1-175452 | 7/1989 | Japan . |
| 2173675 | 10/1986 | United Kingdom . |

OTHER PUBLICATIONS

J. Anderson, et al. of Widcom, Inc., Campbell, California, *Electronics*, "Codec squeezes color teleconferencing through digital telephone lines," Jan. 26, 1984, pp. 113–115.

Rose et al., " Design and Performance of an Analysis-by-Synthesis Class of Predictive Speech Coders," Sep. 1990 IEEE Transactions of Acoustics, Speech & Processing, vol. 38, No. 9, pp. 1489–1503.

(List continued on next page.)

Primary Examiner—Curtis Kuntz
Assistant Examiner—Stella L. Woo
Attorney, Agent, or Firm—Sheridan Ross & McIntosh

[57] ABSTRACT

Apparatus and method are provided for the simultaneous transmission of video information and audio information in substantially real time over an ordinary voice grade telephone line having limited bandwidth in the range of about 300–3400 Hz. Because of the limited bandwidth of the ordinary telephone line, the video and audio information are compressed before transmission thereof. Each of the video information and audio information is separately compressed, mixed together and then further compressed. After the further compression, a composite signal, which includes the mixture of video and audio information, is asynchronously transmitted over the same bandwidth of the ordinary telephone line. Upon reception, the compressed information is expanded and separate video information and audio information are reproduced for viewing and hearing by the receiving party. To reduce the size of the apparatus, application specific integrated circuits (ASICs) are employed. A state machine controller apparatus is integrated with the ASIC technology to control the transfer and storing of video information and audio information and also to control the operation of the various compression and expansion stages associated with the transmitting and receiving channels.

39 Claims, 12 Drawing Sheets

OTHER PUBLICATIONS

Chen et al., "Real–Time Implementation and Performance of a 16 Kb/s Low–Delay CELP Speech Coder," S4a.4 of 1990 IEEE, pp. 181–184.

Chen, "High Quality 16 Kb/s Speech Coding with a One––Way Delay Less than Two ms," S9.1 of 1990 IEEE, pp. 453–456.

Menez et al., "A 2 ms–Delay Adaptive Code Excited Linear Predictive Coder," S9.2 of 1990 IEEE, pp. 457–460.

Gerson et al., "Vector Sum Excited Linear Prediction (VSELP) Speech Coding at 8 kbps," S9.3 of 1990 IEEE, pp. 461–464.

"Codec Squeezes Color Teleconferencing Through Digital Phone Lines," J. Anderson et al. of Widcom, Campbell, CA Jan. 26, 1984 *Electronics* pp. 113–115.

"Design and Performance of an Analysis–By–Synthesis Class of Predictive Speech Coders," Rose et al. Sep. 1990.

*IEEE Transactions of Acoustics, Speech & Processing*: vol. 38, No. 9, pp. 1489–1503.

"Real–Time Implementation and Performance of a 16 Kb/s Low Delay CELP Speech Coder," Chen et al., S4a.4 of 1990 IEEE, pp. 181–184.

"High–Quality 16 Kb/s Speech Coding with a One–Way Delay Less than Two ms," Chen, S9.1 of 1990 IEEE. pp. 453–456.

"A 2 ms–Delay Adaptive Code Excited Linear Predictive Coder," Menez et al., S9.2 of 1990 IEEE, pp. 457–460.

"Vector Sum Excited Linear Prediction (VSELP) Speech Coding at 8 kbps," Gerson et al., S9.3 of 1990 IEEE, pp. 461–464.

C. H. Herbst, "Fernschbilder in Schmalen Kanälen" Funkschan, vol. 58, No. 10, pp. 104–106, May 1986.

VIDEO TELEPHONE SYSTEM

RELATED APPLICATION

This application is a continuation of application Ser. No. 07/628,607, filed Dec. 17, 1990, now U.S. Pat. No. 5,347,305, which is a continuation-in-part of commonly-assigned application Ser. No. 07/482,649, filed Feb. 21, 1990, now U.S. Pat. No. 5,164,980.

FIELD OF THE INVENTION

The present invention relates to video telephones and, in particular, to apparatus and method for asynchronously transmitting and receiving a composite signal, which includes video and audio information, over an ordinary telephone line.

BACKGROUND INFORMATION

Common or ordinary voice grade telephone lines have been utilized for a number of years in connection with the transmission and reception of signals, other than audio signals. Common or ordinary voice grade telephone lines are defined as telephone lines that have substantially the same predetermined or standard bandwidth, i.e. about 300–3400 Hz, and comprise the substantial majority of telephone lines in the United States, as well as in foreign countries, for providing the telephone linkage among residences, public telephones and most businesses. By way of example, common telephone lines, having limited bandwidth, have been used for providing communication between systems or units, such as computers, which are remotely located from each other. Information or data from one computer can be transmitted to and utilized by another computer. Typically, appropriate interfacing between the computers for sending the information or data over the telephone lines is provided by means of a modem.

Ordinary telephone lines have also been used to transmit video signals. The ordinary telephone line, having a bandwidth of about 300–3400 Hz or a transmission rate of about 9.6 kbaud, does not transmit in real time a typical full motion commercial television type digital black and white and/or color digitized video image. The commercial television system displays 512×512 pixel images at 30 frames per second and uses about 6 MHz bandwidth when simultaneously transmitting video and audio signals. Because of the large bandwidth required, prior art systems do not enable one to transmit full motion images over an ordinary voice grade telephone line. In connection with the transmission of video signals, it is also required to transmit audio signals. In accordance with one technique for transmitting video and audio signals, the video signal is transmitted over the ordinary telephone line using a first, predetermined bandwidth of the limited bandwidth of the ordinary telephone line and the audio signal is transmitted using a second, predetermined bandwidth of the limited bandwidth of the ordinary telephone line. With respect to this first method, U.S. Pat. No. 4,849,811 to Kleinerman, issued Jul. 18, 1989, and entitled "Simultaneous Audio and Video Transmission with Restricted Bandwidth" describes a system in which modulated digitized image signals and filtered voice signals are transmitted together over an ordinary telephone line whereby still or freeze-frame images are provided with accompanying video. The telephone line has a limited bandwidth, for example, about 300–3500 Hz. The digitized image signals are in the range of 2400 to less than about 4000 Hz. The low pass filter limits the voice signals to a range outside the digitized image signals so that the image signals and voice signals can be transmitted at the same time but over different bandwidths of the limited bandwidth of the telephone line. Because of the separate frequencies, means must be provided for synchronizing the sending and/or receiving of the video and audio signals. In conjunction with the more rapid transmission of video images, the use of known data compression techniques is mentioned in this patent. Similarly,. in U.S. Pat. No. 3,873,771 to Kleinerman, issued Mar. 25, 1975, and entitled "Simultaneous Transmission of a Video and an Audio Signal Through an Ordinary Telephone Transmission Line," a communication system is disclosed for transmitting video and audio information using different bandwidths of the limited bandwidth of an ordinary telephone line. With regard to the transmission of video information, it is accomplished using slow scan TV techniques so that an image is not transmitted in real time, but rather the transmission requires up to about 8 seconds to transmit an image with 120 scan lines per image.

In accordance with another technique for transmitting video and audio signals, two signals are multiplexed in such a way to enable one of the two signals to be sent when the other of the two signals is not being transmitted. With respect to this second method, U.S. Pat. No. 4,485,400 to Lemelson, issued Nov. 27,1984, and entitled "Video Telephone" describes a system for transmitting video information and audio information over a standard or ordinary telephone line. The system automatically multiplexes audio and video signals. When it is determined that sounds or speech are being inputted, video signal transmission is terminated to allow for uninterrupted voice signal transmission. To identify the presence of the audio signal, a tone signal is provided indicative of audio signal transmission. U.S. Pat. No. 4,715,059 to Cooper-Hart et al., issued Dec. 22, 1987, and entitled "Conversational Video Phone" also discloses the separate transmission of audio and video signals. Video image data is transmitted during normal pauses in the telephone conversation. The objective is to permit the transmission of an image frame in less than about 3 seconds. Similarly, U.S. Pat. No. 4,099,202 to Cavannaugh, issued Jul. 4, 1978, and entitled "Multiplexed Communication of Voice Signals and Slow Scan Television Signals Over a Common Communication Channel" describes a system for multiplexing an audio signal with a slow scan television signal. The slow scan television signal includes horizontal sync pulses and the sync pulses are used in determining whether or not voice transmission should be inhibited.

All of the foregoing systems are not capable of transmitting, in substantially real time, audio and moving video image data together over an ordinary voice grade telephone line. Such systems require from about 3–60 seconds to transmit a still image. This occurs because voice grade telephone lines typically have a bandwidth of only about 300–3400 Hz. Because of this bandwidth, the amount of data or information that can be transmitted in a given time is limited. To overcome this drawback, it is known to use transmission lines, other than ordinary telephone lines, for transmitting voice and video data, or some other combination of at least two different sets of data. In such systems, transmission lines having a significantly greater bandwidth than that of ordinary telephone lines, such as fiber optic lines, are utilized. With regard to fiber optic transmission lines or other transmission lines having a much greater bandwidth than the ordinary telephone line, it is known to transmit video and audio signals in substantially real time. U.S. Pat. No. 4,544,950 to Tu, issued Oct. 1, 1985, and entitled "Technique for the Transmission of Video and Audio Signals Over a Digital Transmission Signal" discloses, in one embodiment, a conversion of a standard color video signal and two audio signals to a determined magnitude of Mbit/s optical signal, which is compatible with a predetermined signal format for transmission over a pre-selected light wave line. The system includes a high speed interface multiplexer that combines video information, video mode status information and audio signals into a first signal format. Regarding this resulting signal, two audio bits or two video mode status bits are inserted for every 48 video bits. The simultaneous transmission of two different signals is also disclosed in U.S. Pat. No. 4,237,484 to Brown et al., issued Dec. 2, 1980, and entitled "Technique for Transmitting Digital Data Together with a Video Signal." In accordance with this technique, an inputted video signal is used with a predicted signal to generate an error signal. The error signal is compressed and combined with a supplementary data signal in an adder for subsequent transmission. The supplementary data signal is applied to a transform circuit before being sent to the adder.. There is no teaching in the patent of sending the signal output by the adder circuit over an ordinary telephone line. Simultaneous transmission of three television signals is disclosed in U.S. Pat. No. 4,593,318 to Eng et al., issued Jun. 3, 1986, and entitled "Technique for the Time Compression Multiplexing of Three Television Signals." In one embodiment of the system, a time compression multiplexing technique enables the transmission of three color television signals through a satellite transponder having a 36 MHz bandwidth in which one field signal and two field differential signals are each time compressed to permit all three signals to be sent in the period of a normal field signal of a standard TV signal. Since there are three TV sources, with each producing stereo audio, six audio signals are also transmitted. The stereo audio from each source is sent along with the video by inserting digital audio in either the vertical or horizontal blanking periods associated with the video.

In addition to providing an increased bandwidth in order to transmit a plurality of signals including video and audio signals, as some of the foregoing patents indicate, data compression techniques are employed so that compressed video information can be transmitted for subsequent expansion at a receiver station, without meaningful loss of transmitted information. In a publication from the Jan. 26, 1984, issue of *Electronics* entitled "Codec Squeezes Color Teleconferencing Through Digital Phone Lines" of J. Anderson, S. C. Fralick, E. Hamilton, A. G. Tescher and R. D. Widergren of Widcom Inc., Campbell, California, pages 113–115, various compression methods are utilized for transmitting video image data over a digital telephone line at a rate of 56 kilobits/s. The system disclosed in this publication is directed to video signal transmission and not video and audio transmission. In particular, the publication addresses compression at ratios of up to 1440:1. To achieve the compression, spectral, spatial and temporal compression techniques are employed. These data compression techniques are utilized in such a way to exploit the human eye's forgiving nature so as to make the tradeoffs that cause the least objectionable losses in picture quality. In connection with the compression, comparisons are made between new pixel information and previously transmitted pixel information so that only video information that is changing need be sent. The disclosed technique also employs an encoding method that is based on the two-dimensional cosine transform. The use of a state machine is also disclosed for looking up actual codes in Huffman code tables. Although image motion can be above a determined average where more updating is required, typically, only 10% of the pixel information needs to be replenished at the rate of 10 frames/s. The compressed video information is decoded at the receiver so that a resulting 30 frames/s rate of video information can be displayed.

With respect to compression of audio data, in addition to fast cosine transform techniques, it is well known to utilize linear predictive coding (LPC) to reduce or compress audio data being sent over a transmitting medium. Briefly, the predicting of audio data using LPC s is based on an analysis of actual, sampled audio information. Using the sampled audio, mathematical techniques are employed to obtain information that models the audio data. Such information is transmitted. At the receiving end, such audio related information permits an accurate reconstruction of the actual audio. Like the fast cosine transform, LPC techniques permit the use of limited bandwidth transmitting lines, while permitting accurate reconstruction of the actual audio. LPC is discussed, for example, in an article published in Vol. 38, No. 9, Sep. 1990 of IEEE entitled Design and Performance of an Analysis-by-Synthesis Class of Predictive Speech Coders by Richard Rose and Thomas P. Barnwell III.

In sum, many systems have been proposed or devised for transmitting video information and/or audio information, but none has been provided that relatively inexpensively sends and receives, in substantially real time, both video information and audio information over an ordinary voice grade telephone line. It would be advantageous to have such a system in order to provide real time viewing at transmitting and receiving telephones. By doing so, desirable face-to-face contact would be achieved to enhance personal, as well as business, communications. Furthermore, substantially real time viewing of documents and things would result, without meaningful sacrifice of image quality and detail.

SUMMARY OF THE INVENTION

The present invention relates to a video telephone system in which video information is transmitted simultaneously with audio information in substantially real time over ordinary voice grade telephone lines. Video and audio information are transmitted simultaneously by means of a composite signal that includes a mixture of both video data and audio data. The video information and the audio information are transmitted over the telephone line using the same bandwidth or frequency range. There is no separate bandwidth for video and audio signals. Accordingly, the video and audio information is transmitted asynchronously so that expensive synchronization hardware need not be incorporated into the present system. Preferably, the present video telephone system extensively incorporates application specific integrated circuits (ASICs). The hardware for the video telephone system can therefore be provided so as to occupy minimal space. In connection with the processing of video and audio information, a number of data compression and, upon reception of the compressed data, a number of data expansion methods are employed so that the video and audio information can be transmitted over the limited bandwidth of an ordinary telephone line. In that regard, the video telephone system compresses video information for subsequent substantially real time viewing but avoids or minimizes losses of useful information due to the data compression. With respect to the processing of video and audio information, including that associated with video and audio data compression and expansion, a state machine controller apparatus is utilized. The state machine controller apparatus is provided using the ASIC technology and enables the system to control the transfer and processing of data along the transmitting and receiving channels of the system when required whereby video and audio data is processed to provide the substantially real time imaging, together with any accompanying audio or voice information. Although a single state machine controller apparatus is provided for controlling the entire video telephone system, the system will be described in terms of a number of state machine controllers associated with one or more particular functions.

More particularly, the video telephone system includes a camera device for acquiring image information within its range and for converting the images into an analog video signal. The analog video signal is digitized using an analog-to-digital converter. The digitized video signal having video information is then applied to a first or camera image storage memory. A first state machine controller controls the conversion to digital video data and monitors the camera image storage memory. The digitized video signal is next received by an image reduction unit for reducing or compressing in spatial mode the number of video data points or pixels received from the camera device. In one embodiment, the camera device outputs video information based on a 96×96 matrix of pixels. That is, there are 96 columns by 96 rows of data points, each of which is defined or comprised of 8 digital bits in the case of a monochromatic image and 15 bits where the image is in color. The image reduction unit reduces or compresses this video information by 9 times to a 32×32 matrix of pixels. This is accomplished by an averaging method whereby useful or necessary video information is kept for further processing and eventual transmission. As a result of the image reduction unit, the video information is compressed by a factor of 9. A second state machine controller controls the transfer of digitized video data from the camera image storage memory to the image reduction unit, as well as controlling the operation of the averaging steps for providing reduced image data.

The compressed video data is then applied to a video fast cosine transform operator unit for converting the digitized video data from the time domain to the frequency domain so that the video data can be further compressed, while avoiding video information losses that would adversely affect the quality of the image being sent. In one embodiment, the video fast cosine transform operator unit outputs 1024 16-bit video information coefficients from the inputted 1024 (32× 32) 8-bit pixels. The digital data from the video fast cosine transform operator unit is applied to a video coefficients selector unit for selecting and retaining only 400 of the 1024 coefficients inputted thereto. The selection is based on the energy content of the inputted coefficients and the selected coefficients have higher magnitudes than the rejected coefficients whereby the video information is further compressed without detrimentally affecting the video information content. The output of the video coefficients selector unit is then inputted to a video coefficients converter unit for additionally compressing the video information. That is, by a preferred method of obtaining the square root of each of the 400 16-bit coefficients representing video information inputted thereto, the video coefficients converter unit outputs 400 video data words having 8 bits each so that the video information is additionally compressed by a factor of 2. The output of the video coefficients converter unit is sent to a video subtractor unit or comparison device for comparing current and previous images or video information so that only different video information is transmitted for updating previously sent video information, without meaningful loss of quality of video information. The use of the comparison device results in a further compression of video information by a factor of about 2. In connection with implementing or providing these video data compression techniques, additional state machine controllers are utilized for controlling the transfer of video information and performing the necessary processing or arithmetical steps that are required to compress the inputted video data received by the coefficients selector unit, the coefficients converter unit and the comparison device.

The output of the comparison device is applied to a video data storage device. Another state machine controller controls the reading of video data from the video data storage device and inputs it to a video/audio data mixer. In one embodiment, the inputted video data is stored or characterized as real data for use by a fast Fourier transform operator of the video/audio data mixer.

With respect to the transmission of audio information along an audio transmitting channel, the apparatus includes a transducer, such as a microphone, for receiving sounds including those generated by the speaker's voice. The microphone Converts the sounds to an analog audio signal, which is amplified, and then sent to a low pass filter for eliminating signal content having a greater frequency than the typical audio frequency range. The output of the low pass filter is then applied to a further audio amplifier for amplification of the filtered audio signal. The amplified analog audio signal is converted to digitized audio data using an analog-to-digital converter. The digitized audio data is then sent to an audio or voice data storage memory that can be accessed by, in one embodiment, an audio fast cosine transform operator unit. A first audio state machine controller controls the conversion of the analog audio signal to digitized audio data and also monitors the contents of the audio data memory. The audio fast cosine transform operator unit includes a second audio state machine controller for controlling the transfer of digitized audio data from the audio data memory so that such data can be converted from the time domain to the frequency domain. Once the audio data is in the frequency domain, it can be compressed without meaningful loss of audio information. The audio fast cosine transform operator unit also includes an audio random access memory for storing the frequency domain audio information therein. In one embodiment, the output of the audio cosine transform operator unit is defined as being 256 16-bit data points or words. The 256 points are based on a preferred matrix of 256×1 audio data points. This particular matrix is preferred because it represents audio data that is significantly compressed for proper transmission over the limited bandwidth telephone line but without meaningful loss of audio quality. These 16-bit data points are inputted to an audio coefficients selector unit, which determines or selects a predetermined number of the 16-bit data points having a higher magnitude than the other data points. In one embodiment, the audio coefficients selector unit selects and outputs only 50 16-bit data points thereby compressing the audio information by a factor of about 5 (256/50). The output of the audio coefficients selector unit is then sent to an audio coefficients converter unit, which reduces or compresses the audio information by a further factor of 2 and outputs 50 8-bit data points. Like the video coefficients converter unit, the audio coefficients converter unit preferably implements an algorithm for obtaining the square root of the inputted audio coefficients. The output of the audio coefficients converter unit communicates with an audio data storage device for receiving the compressed audio data. Another audio state machine controller controls the transfer of audio data and the operation of the audio coefficients selector unit and the audio coefficients converter unit, as well as controls the timing and transfer of audio data from the random access memory and to the audio data storage device. For proper further processing with the video information, the audio information is stored in the audio data storage device as imaginary numbers for transmission to the video/audio data mixer.

The video/audio data mixer includes the fast Fourier transform operator for receiving compressed video data, as real numbers, and compressed audio data, as imaginary numbers. As a result of the execution of a fast Fourier transform using the fast Fourier transform operator, the mixture of image and voice data is achieved. The mixed video and audio data is stored in a video/audio data mixer memory. Control of the fast Fourier transform operator and the transfer to the mixer memory is accomplished using an additional state machine controller. The mixed video and audio information is stored in the mixer memory as complex numbers, which are next applied to an adaptive differential pulse coding unit. Preferably, only the first half of the complex numbers or data points are transmitted to the adaptive differential pulse coding unit, with the first half of the numbers being defined as located above a diagonal line that extends from the bottom left hand corner to the top right hand corner of a matrix that includes the complex numbers, which were obtained as a result of the fast Fourier transform. Such numbers significantly represent the combined video and audio information, based on their energy content. This unit further compresses the information to be transmitted. Specifically, it compresses the mixed video and audio information by a factor within the range of about 2–5 times. More specifically, the adaptive differential pulse coding unit compares the current set of complex numbers or mixed video/audio information with the previous set so that only mixed data that has changed or is different from the previous data is identified for transmission. The mixed video/audio data from the adaptive differential pulse coding unit is sent to a modulator unit. The modulator unit uses the mixed video/audio digital data to pulse code modulate a carrier wave. In one embodiment, the magnitude of the carrier frequency depends upon whether the transmitting station is the originating station or the responding station. Where the mixed data is being transmitted by an originating station, the carrier frequency is 3000 Hz, while the carrier frequency is 1200 Hz when it is responding to a transmission from an originating station. The carrier frequency is preferably modulated using pulse code modulation (PCM). The pulse code modulated carrier frequency that includes the mixed video/audio data is then transmitted over the ordinary voice grade telephone line to the receiving station.

With regard to the receipt and reproduction of the transmitted video information and audio information, the received, modulated composite signal is demodulated. Methods comparable to those used in compressing the mixed video/audio data, as well as separately compressed video and audio data, are then employed to decompress or expand the received data. Likewise also, a number of state machine controllers integrated with one or more ASIC circuits, and together constituting the single state machine controller apparatus, are provided to effect the expansion operations, as well as the transfer of video and audio data including the mixed video/audio data. In particular, the audio information is obtained from the transmitted mixed video/audio data, further expanded and converted to an analog signal for applying to a conventional speaker piece or unit so that the transmitted audio can be heard by the listener. Likewise, separate video information is obtained from the mixed video/audio data that was transmitted, further expanded and converted to an analog video signal for subsequent reproduction or reconversion as a number of pixels, which comprise the transmitted image, using a conventional display or monitor, such as a CRT or liquid crystal display.

In another embodiment, instead of using the fast cosine transform to compress inputted audio data, a linear predictive coding (LPC) coder determines predictor coefficients or values that are used to accurately model or predict audio data, based on actual, sampled audio data. In this manner, actual audio data can be accurately represented by the determined information, which is transmitted over ordinary voice grade telephone lines having limited bandwidth. The LPC method approximates the inputted audio data based on the premise that a sample of speech or audio information can be approximated as a linear combination of previous "p" speech samples. The approximation relies on use of determined predictor coefficients A(i), with $1 \leq i \leq p$. Such predictor coefficients are utilized with actual speech signal samples S(M) to linearly predict further and other speech samples. Briefly, if values of A(i), for i=1 to p are known, then further values of the speech can be calculated or "predicted." The LPC coder computes the "p" speech predictor coefficients.

In connection with the LPC coder implementation, the raw audio data is digitized at a predetermined number of samples/second. A preselected or predetermined number (N) of consecutive samples of speech are processed by the LPC. For each determination using N samples, "p" predictor coefficients are determined. In addition to the determination of LPC coefficients, the LPC coder also includes a pitch period detector for detecting the period K of the N samples of the inputted raw audio data or speech. The pitch period K approximates the time before the audio signal repeats itself. The pitch period is also used to determine whether the presently received raw audio data is voiced speech (voice cords are used for the speech) or unvoiced speech. In the case of "unvoiced" speech, there is no pitch period since such an audio signal is random and not periodic. Additionally, the detected pitch period and speech signal samples S(M) are inputted to a gain factor circuit for determining a gain factor or factors associated with the N samples of speech and which will be used in accurately reproducing the speech at the receiver station. In that regard, when the LPC coder is utilized, for each N samples of audio data to be transmitted, a predetermined number of bits representing the determined pitch period, a number of predetermined bits representing each of the predictor coefficients and a predetermined number of bits representing the value(s) of the gain. After transmission over the common telephone lines or other transmission medium, such audio related information is inputted to a receiver of compressed audio data. This receiver separately outputs signals representative of the magnitudes of the LPC coefficients, the pitch period and the gain factors. The signals representative of such audio information are employed to synthesize real time actual audio data that accurately represents the raw speech that is inputted at the transmitting station.

The LPC method is preferred over the fast cosine transform compression technique for "compressing" audio data. The LPC coder, on a relative basis, is more accurately able to represent the raw speech being transmitted at the limited bandwidth. Hence, when the raw speech is "decompressed" at the receiving end, a relatively higher quality of speech is achieved.

In addition to the foregoing components of the video telephone system, it also preferably includes a security encoder for use in preventing understanding of the transmitted mixed video/audio data by anyone other than the person or persons for whom the transmission is intended. In connection with the transmission of video information and audio information to only a particular person or persons, those persons must be provided with the necessary security encoder information to properly decode the transmitted video and audio information. The system also preferably includes a telephone line bandwidth testing device for determining the useful bandwidth of the telephone line or lines over which the video/audio data transmission is to occur. As a result of such testing, the rate of transmission of video and audio data can be optimized. For example, it might be determined that the telephone line or lines over which the transmission is to occur has a relatively greater bandwidth in order to permit the transmission of mixed video/audio data at a relatively greater rate. In such a case, the transmission of the data can be made in a manner that best utilizes or optimizes the greater bandwidth. To enhance the quality of the video images being transmitted, the camera device has an autofocusing capability whereby the camera lens is physically adjustable using a feedback loop and a converging algorithm. That is, the lens of the camera device is checked at a first position for optimum focusing. It is then checked at a second position, depending upon whether or not the second position results in a better focus or not, the position of the camera lens is adjusted in a direction or manner that is intended to improve the focus. These steps are continued until the focus is optimized. The video telephone system further enables the called party to record a video message, as well as an audio message, when the called party does not respond to the telephone ring from the originating station because, for example, the called party is not there when the telephone call is made. A video storage device can be activated for storing the compressed, mixed video/audio data for later processing and expansion by the called party at his/her convenience.

In view of the foregoing summary, a number of salient features of the present invention are readily discerned. A video telephone system is provided for transmitting images or video information over ordinary voice grade telephone lines. This is accomplished in substantially real time so that the party receiving the video message perceives video images from the transmitting party at substantially the same time that they are sent so that a realistic, rather than a still or freeze frame, display is presented. The video and audio information are transmitted together in asynchronous fashion so that costly synchronizing hardware is not needed. The present invention results in the transmission over a limited bandwidth of useful quality and useful resolution picture or image. This is accomplished by transmitting only compressed video information that results in a substantially real time video transmission, while avoiding or minimizing unwanted losses due to video data compression. In that regard, the transmission rate is selected so as to provide realistic viewing by the recipient while not transmitting at an unnecessarily greater rate. For example, the present invention preferably does not transmit video images at the television rate of 30 frames/second. Rather, image updating can be provided at a rate of about 7–7.5 frames/second without sacrificing realistic picture viewing. Additionally, rapid and efficient processing of video information and audio information are provided in the present system by means of state machine controllers. Data compression and data expansion techniques are uniquely configured to achieve the substantially real time transmission and reception, including separate compression and expansion of video information and audio information, as well as compression and expansion of mixed video/audio data. This enhanced processing of data is also realized because of the utilization of a state machine controller apparatus, instead of microprocessors, whereby less time is expended in performing the necessary data transfer and data computation steps. Further, the various processing steps are rapidly executed by means of operations that occur when necessary. Lastly, the video telephone system has a compact size primarily due to the use of ASIC technology so that various hardware components, including those that constitute the state machine controller apparatus, can be formed and provided in minute spaces and, even though there are thousands of logic gates provided as part of the state machine controller apparatus, such can be constructed so as to result in extremely small spaces being occupied by the hardware of the present system.

Additional advantages of the present invention will become readily apparent from the following discussion, particularly when taken together with the accompanying drawings.

DETAILED DESCRIPTION

In accordance with the present invention, a telephone system is provided for transmitting images, together with sounds, over ordinary voice grade digital or analog telephone lines, having a limited bandwidth, in substantially real time. As used herein, substantially real time refers to the capability of providing images to a receiving party over such telephone lines at about the same time they are occurring at the transmitting party telephone station and in contrast to video telephone systems in which freeze or still frame pictures are sent over such ordinary telephone lines. The substantially real time transmission is primarily achieved using a number of data compression, and subsequent data expansion, methods that compress, and then expand, the video information, in one embodiment, by a total factor of at least 57 times.

Figure 1:
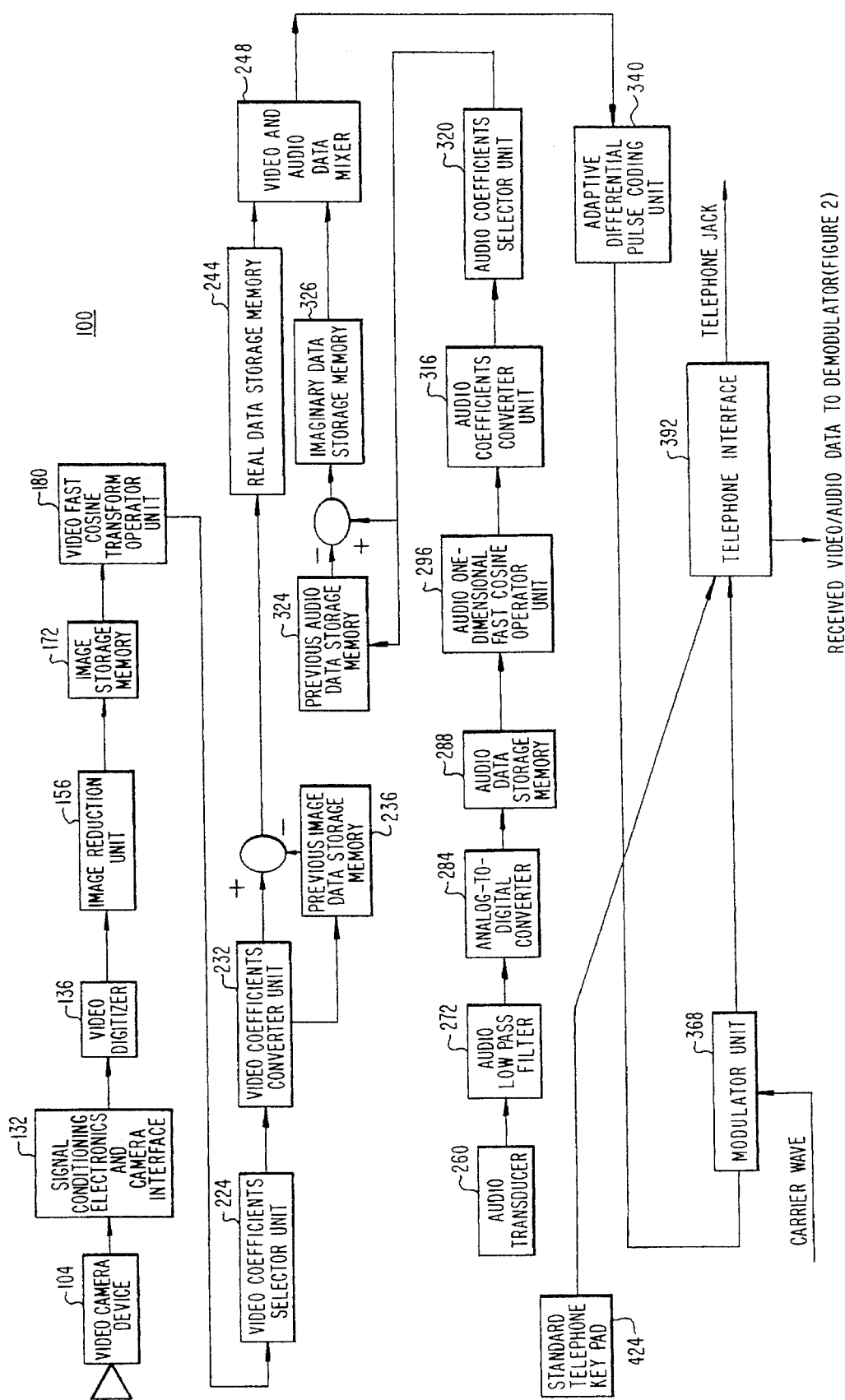
FIG. 1 is a block diagram of the audio and video transmitting channels of the video telephone system.
Figure 3:
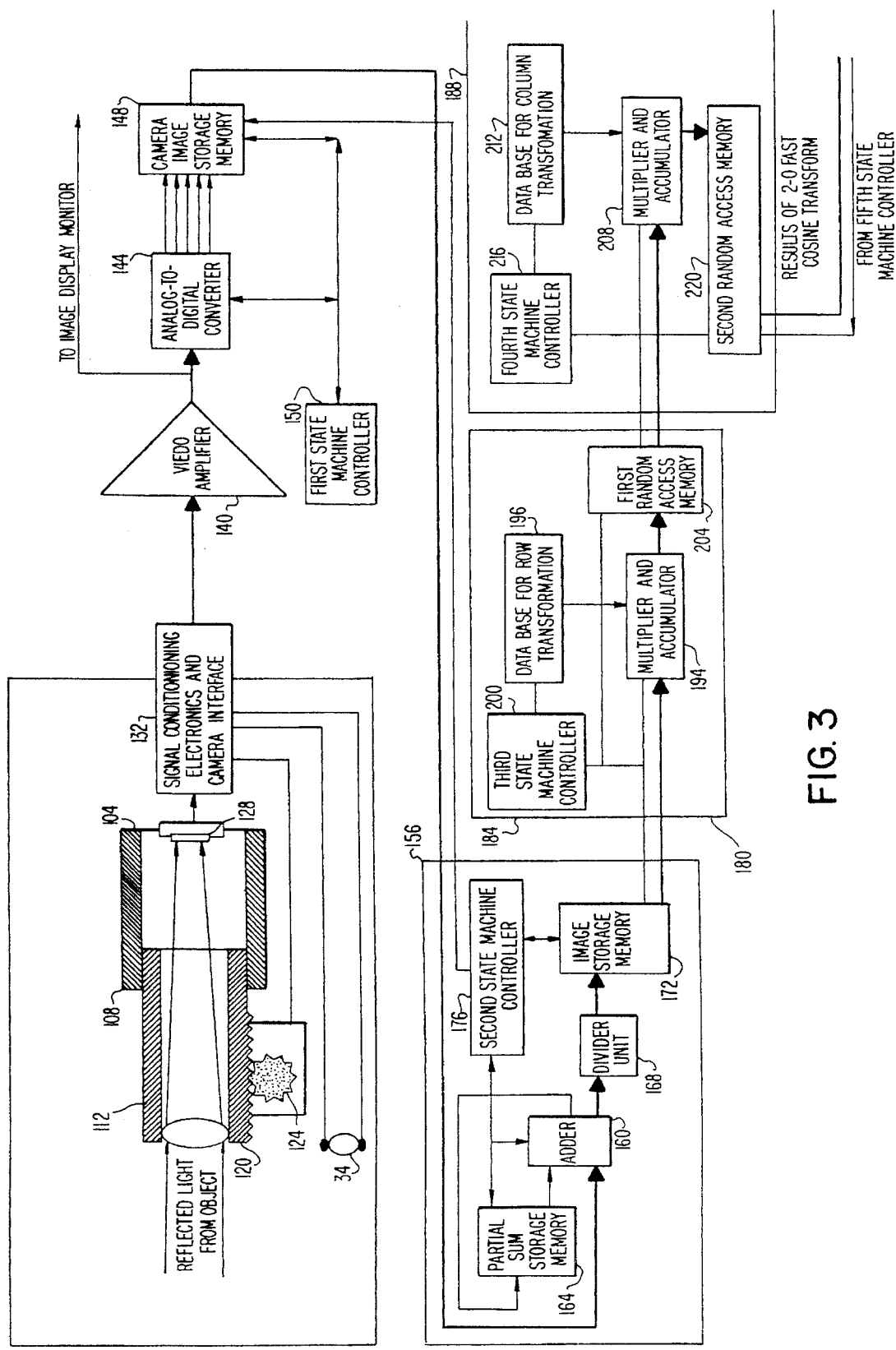
FIG. 3 is a block diagram illustrating further details of the camera device, the video digitizer, image reduction unit and two-dimensional fast cosine transform operator unit of the video transmission channel.

With reference initially to FIG. 1, the video transmission channel relating to the obtaining and processing of video information for transmission will first be described. The telephone system 100 includes a video camera device 104 for receiving light reflected from an object or objects that are being viewed by the camera device 104 and for converting such light information to video signals having video information. With reference also to FIG. 3, the camera device 104 includes a camera body 108 and a linearly movable adjusting member 112 that is adapted to move relative to the camera body 108. Fixedly held within the adjustable member 112 is a lens device 116 for receiving and focusing the reflected light. The camera device 104 includes mechanical hardware for use in causing movement of the adjustable member 112 relative to the camera body 108. The mechanical hardware includes, in one embodiment, rack 120 and pinion 124. The rack 120 is formed as part of the adjustable member 112, while the pinion 124 is caused to move or rotate so that it moves along the teeth of the rack 120 to thereby move the adjustable member 112 in a selected one of two directions of movement, either towards the camera body 108 or away therefrom. The camera device 104 also includes a light sensitive device or image sensor 128, which may be a two dimensional capacitor charged coupled device (CCD) or MOS type array, for sensing the intensity of the light reflected from the object or objects within the range of the lens device 116. The microvolt level output from the image sensor 128 is filtered and amplified to a one volt peak level by signal conditioning electronics and camera interface 132. The camera device 104 also includes a photosensor 134 for receiving or sensing light. The photosensor 134 is used to adjust the biasing of the image sensor 128 so that the image sensor 128 is able to automatically adjust in response to the surrounding light.

The camera device 104 is able to focus automatically. A focused image has sharper edges than unfocused images. The sharper edges are due to the presence of greater amounts of high frequency components. The signal conditioning electronics and camera interface 132 measures such high frequency components, with the lens device 116 being located at a first position. The lens device 116 is then moved to a second position using the adjustable member 112 and the high frequency components associated with the sharper edges are measured again. The difference between the two measurements is utilized to predict a next position of the lens device 116 that may result in the maximum high frequency components being obtained. In conjunction with making this determination, the video information output of the center line of the image sensor 128 is received by a one-dimensional cosine transform operator found within the signal conditioning electronics and camera interface 132. The high frequency coefficients obtained by this cosine transform operation are measured. Based on the results of the measurement, the lens device 116 is electromechanically moved using the adjustable member 112. The new video information output of the center line of the image sensor 128 is transformed using the fast cosine transform. The high frequency coefficients obtained as a result of this transform are measured. The lens device 116 is again moved forward or backward until it reaches a position that results in the highest magnitude of high frequency coefficients. At this point, the camera device 104 is properly adjusted.

The analog video signal having video information outputted from the camera device 104 is supplied to a video digitizer 136, which includes a video amplifier 140 for amplifying the 0–1 volt peak level output to a 0–5 volt peak-to-peak level. The amplified video signal is then applied to an analog-to-digital converter 144 for converting the analog video signal to a digitized video signal. Digitized video information represented by the digitized video signal is stored in a first or camera image storage memory 148. The first memory 148 is, preferably, a first in/first out (FIFO) type memory. The use of the FIFO memory allows data or information to be written into the memory by one controller while another controller is reading from the same memory. In conjunction with the reading and writing operations, the video digitizer 136 includes a first state machine controller 150, which communicates with the analog-to-digital converter 144 and the first memory 148. The first state machine controller 150 controls the sampling or operation of the analog-to-digital converter 144 and monitors the status of the first memory 148. That is, the first state machine controller 150 checks or monitors the contents of the first memory 148 to make sure that memory space is available and controls where the digitized video information should be stored therein. The first state machine controller 150, like the other state machine controllers to be described herein, are optimally custom designed to execute only one predetermined major task. Such state machines can perform the required operations or instructions in significantly less time than conventional microprocessors. For example, the execution speed of the state machine controller can be up to 50 times faster than that of a typical general purpose microprocessor. Microprocessors are designed to execute one instruction at a time using more than one clock cycle, while the state machine controller can acquire two numbers from two different locations, add them, and store the result at a third location in only one clock cycle.

In one embodiment, the first state machine controller 150 controls the analog-to-digital converter 144 such that the inputted analog video signal is sampled at a sampling rate from 9000–262,000 samples per image frame, depending on image size. The analog-to-digital converter 144 digitizes the inputted analog signal to an 8-bit resolution in the case of a monochrome image and, in the case of color images, a total of 15 bits per word, with there being to a 5 bits for each of the red, green and blue colors. In the preferred embodiment, the amplified analog video signal outputted by the video amplifier 140 is also provided to an analog multiplexer and an image display unit of video information receiving hardware (see FIG. 8).

The video telephone system 100 also includes an image reduction unit 156 for compressing video image data stored in the first memory 148. In particular, the image reduction unit 156 implements a spatial mode of data compression to reduce the image size of the video data from a first matrix size having a number of pixels to a second, smaller matrix size having a second, reduced number of pixels. In one embodiment, the image reduction unit 156 compresses a frame having 96×96 pixels to one of 32×32 pixels. The image reduction unit 156 includes an adder 160 for receiving video information from the first memory and adding the same to an input from a partial sum storage memory 164. In one embodiment, individual video information from the first memory 148 is received for nine different pixels. The nine pixels of video information are obtained from three consecutive lines or rows of pixels of a particular frame and, for each of such rows, the three pixels are located next to each other, starting with the beginning of the row or line. In connection with reducing the image data, memory locations in the partial sum storage memory 164 are cleared. The first pixel of the top line or row for a particular frame is acquired from the first memory 148. This first pixel is added to the cleared output from the partial sum storage memory 164 using the adder 160. The result is stored in the partial sum storage memory 164. The second pixel of that same top line, which is the pixel adjacent to the first pixel, is then acquired from the first memory 148 and added to the partial sum stored in the memory 164. The third pixel of the same top line is then obtained from the first memory 148 and added to the result of the addition, which was previously stored in a first location of the memory 164. Then the next three pixels of the same top line are added in the same way and the resulting sum is stored in a second location of the memory 164. This process is continued for all of the pixels of the top line, with the sums being stored in N/3 different locations in the memory 164, where N is the total number of pixels per line. Subsequently, the sum of the first three pixels of the next line are added to the partial sum stored in the first location of the partial sum storage memory 164. Similarly, the sum of the next adjacent three pixels of the same second line is added to that partial sum stored in the second location of the memory 164. This process is repeated until the sum of three pixels in all three pixel segments of the second line are added to the partial sum of the corresponding segment of the first line. These steps are repeated for the third line of the frame. However, when the third pixel of each three pixel segment is added to the partial sum, the resulting sum is applied to a divider unit 168 for dividing the resulting sum by 9. The result of this division is written in a second or 32×32 image storage memory 172, which is also preferably a first in/first out memory. At the same time that this division result is being written into the second memory 172, the first location in the memory 164 is being cleared. As a result, the second memory 172 contains a magnitude or value that is the average of the first 3×3 pixel block and the next location in the second memory 172 contains the average of the next 3×3 pixel block. As can be understood, further and adjacent memory locations of the second memory 172 contain averages of other and the remaining 3×3 pixel blocks.

The image reduction unit 156 also includes a second state machine controller 176, which communicates with the adder 160, partial sum storage memory 164, divider unit 168 and the second memory 172, as well as the first memory 148. The second state machine controller 176 controls the timing and data transfer from the first memory 148, controls the adding of video data using the adder 160, stores and retrieves partial sum video data using the memory 164, activates the divider unit 168, controls timing and data transfer from the first memory 148 for conducing the averaging process, as well as monitoring and controlling the contents of the second memory 172. As can be appreciated, the use of the first and second state machine controllers 150, 176, as well as the first in/first out memories 148, 172, permits video data to be written into the first memory 148 at the same time video data is being read out therefrom for image compression. Consequently, the steps of video digitizing can occur at the same time image compression is occurring on other video data using the image reduction unit 156.

The video telephone system 100 also includes an apparatus for converting the compressed video information, inputted by the image reduction unit 156, from the time domain to the frequency domain. In the preferred embodiment, this conversion of image data is accomplished using a video fast cosine transform operator unit 180. The fast cosine transform operator unit 180 includes a row transform operator unit 184 and a column transform operator unit 188. The row transform operator unit 184 includes a 16-bit multiplier and accumulator 192 and a data base for row transformation 196. The operation and timing of these units is controlled by a third state machine controller 200. The row transformation, as part of the fast cosine transform, is accomplished using well-known techniques. That is, the transformation acquires video data from the second memory 172 to be multiplied with a basis vector matrix [B]. The basis vector matrix has the property that $[B]*[B]^T=[1]$, where [B] is a square matrix and $[B]^T$ is its transpose. The values of the elements of the [B] matrix are stored in the data base 196. With regard to the values of such elements, if [B]matrix has a N×N size and b(i,j) is its element in the i-th row and the j-th column, the value of the element b(1,j) of [B] matrix is computed using the following formula: b(1,j)=1/sqrt (N) for i=1 and j=1 to N; or b(i,j)=sqrt 2/N)*cos(pi*(i−1)*2*(j−1)+ 1)/2*N)) when i is greater than 1. The matrix [1] is an identity matrix in which all elements thereof are zeros except elements on the diagonal from the top left corner to the bottom right corner, each of which has a value of one. During the row transformation using the row transform operator unit 184, the [B] matrix is multiplied by a [V]matrix to obtain a [R] matrix, i.e. [R]=[B]*[V]. The matrix [V] includes the video data outputted from the second memory 172. The elements of the [R] matrix are stored in a first random access memory 204, as they are obtained by the computation performed in the 16-bit multiplier and accumulator 192. The third state machine controller 200 controls the transfer of the compressed video data from the second memory 172 to the 16-bit multiplier and accumulator 192, as well as controlling the transfer of the [B] matrix elements from the data base 196 to the multiplier and accumulator 192, together with controlling the operation of the multiplier and accumulator 192. Similar to the cooperation between the first and second state machine controllers 152, 176, the third state machine controller 200 is able to control the row-wise transformation by accessing the second memory 172 at the same time the second state machine controller 176 is controlling the inputting of average video data thereto.

With respect to the column transform operator unit 188, it includes elements comparable to the row transform operator unit 184 including a 16-bit multiplier and accumulator 208 for receiving the results of the row-wise transformation stored in the first random access memory 204. The multiplier data base for column transformation 212 is provided in communication with the 16-bit multiplier and accumulator 208. The element values of the matrix $[B]^T$ which are required to perform the column-wise transformation, are stored in the multiplier data base 212 for transfer to the 16-bit multiplier and accumulator 208, under the control of a fourth state machine controller 216. The element values of the [R] matrix are applied to the 16-bit multiplier and accumulator 208 to effect the column-wise transformation and obtain a resulting [C] matrix using the formula [C]=[R] $*[B]^T$. The elements of the [C] matrix are the coefficients obtained as a result of the two-dimensional fast cosine transformation. The elements of the [C] matrix are stored in the second random access memory 220. Similar to the third state machine controller 200, the fourth state machine controller 216 controls data transfer from the first random access memory 204, transfer of column data base data to the 16-bit multiplier and accumulator 208 from the data base 212, and the transfer of a resulting computed [C] matrix to the second random access memory 220. As a result of the fast cosine transformation unit, in the embodiment in which a 32×32 pixel matrix constitutes the image frame and a monochrome image is being provided, with each pixel being represented by 8 bits, the output from the fast cosine transform operator unit 180, for each frame, includes 1024 16-bit video data words or points. It should be understood that the matrices stored in the multiplier data bases 196, 212 could be provided so as to permit two-dimensional cosine transformation on a variety of matrix sizes such as 4×4, 8×8, 16×16, 32×32, 64×64, 128×128 and 256×256 matrices or blocks of image data.

Figure 4:
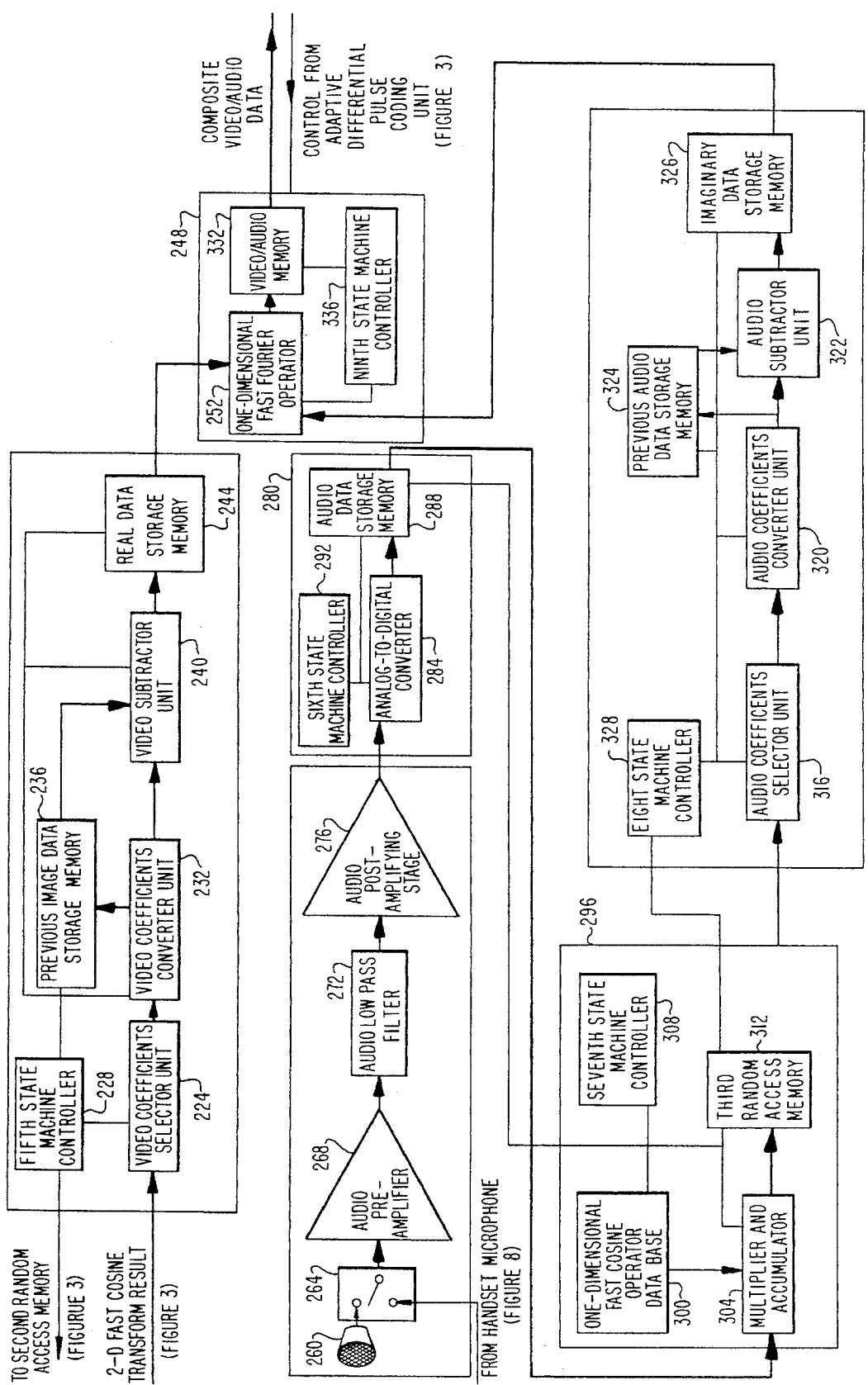
FIG. 4 is a block diagram illustrating further details of the audio transmitting channel, the compression of video data by means of the coefficients selector, square root extractor and subtractor units and the video/audio data mixer.

Referring now to FIG. 4, as well as FIG. 1, the video telephone system 100 also includes a video coefficients selector unit 224, which communicates with the second random access memory 220. Under the control of a fifth state machine controller 228, the results of the two-dimensional fast cosine transformation are applied to the coefficients selector unit 224, which performs an analysis. of the cosine transform coefficients and determines, for outputting therefrom, only those minimum number of coefficients whose combined energy content is more than a predetermined percentage of the total energy of such coefficients. In the embodiment in which a frame constitutes 1024 16-bit coefficients, the coefficients selector unit 24 outputs a total of 400 16-bit data words thereby further compressing the video information associated with one frame by a factor of about 2.5 (1024/400).

Further compression of the video information along the video transmitting channel is accomplished using a compression technique and hardware that reduces the number of bits that make up the video data words. In one embodiment, the number of data bits is reduced from 16 bits/word to 8-bits/word. This is preferably accomplished using a video coefficients converter or square root extractor unit 232, which obtains the square root of each 16-bit word inputted thereto. The operation of the square root extractor unit 232 is controlled by the fifth state machine controller 228. As a result, the video data is compressed by a factor of two using the square root extractor unit 232. Each of the 8-bit coefficients obtained by the square root operation is stored in a third first in/first out or previous image data storage memory 236 under the control of the fifth state machine controller 228. The coding with the square root method is preferred over merely dropping or discounting the least significant 8-bits from the 16-bit data word because, in connection with the dropping technique, the lower magnitude numbers of the coefficients are subsequently magnified 256 times when the 8-bit coefficients are restored to 16-bit coefficients at the receiving station. In such a case, the expanded image would have poorer quality.

To further compress the video information, the video telephone system 100 includes a video subtractor unit 240, which cooperates with the output of the square root extractor 232 and an input received from the third memory 236. That is, to reduce the transmission of redundant video information, previously transmitted video information is compared with current video information so that only the difference between two consecutive images is transmitted. In that regard, the fifth state machine controller 228 controls video data transfer from the third memory 236 to the subtractor unit 240, as well as the outputting of the square root value from the square root extractor unit 232 so that a comparison or subtraction can be made by the subtractor 240 under the control of the fifth state machine controller 228. The coded difference between successive frames or images outputted by the subtractor unit 240 is then applied to a fourth first in/first out or real data storage memory 244. Control and monitoring of the transfer of the further compressed video data to the fourth memory 244 is controlled by the fifth state machine controller 228. As can be appreciated, such control occurs concurrently with the other operations associated with compressing the video information, such as which are accomplished by the coefficients selector unit 24 and the square root extractor unit 232. As a result of the operation of the subtractor unit 240, the video information is compressed by an additional factor of two.

The video telephone system 100 further includes a video and audio data mixer 248 for outputting a composite signal having mixed video information and audio information. The mixer 248 includes a one-dimensional fast Fourier operator 252, which requires complex numbers as its inputs. In the preferred embodiment, the compressed video information is fed to the fast Fourier operator 252 as real numbers and audio information is fed thereto as imaginary numbers, although the video information could constitute the imaginary numbers and the audio information could constitute the real numbers.

With respect to the generation of compressed audio information for eventual inputting to the one-dimensional fast Fourier operator 252 of the video and audio data mixer 248, reference is made to the transmitting audio channel of FIG. 1, as well as FIG. 4, which illustrates details of the audio transmission channel. In particular, an audio transducer 260, such as a microphone, is utilized for receiving sounds typically inputted by the speaker or caller using the video telephone system 100. The microvolt level output of the transducer 260 is selected by a microphone selector switch 264. The output generated by the transducer 260 is amplified by the pre-amplifier 268 to a 0–2 volt peak-to-peak level. The amplified analog audio signal is received by an audio low pass filter 272, which allows only low frequency voice or audio signals to pass through. Such audio signals have less than a frequency of about 3000 Hz. All other frequencies are rejected or filtered out. The output of the low pass filter 272 is then applied to an audio post-amplifying stage 276 for further amplification to obtain a 0–5 volt level analog voice signal. Two-stage amplification of the audio signal is used to reduce offset and saturation error effects on the audio signal.

The audio transmitting channel of the video telephone system 100 also includes an audio digitizer 280 for generating digitized values of inputted analog audio information. The audio digitizer 280 includes an analog- to-digital converter 284, which receives the analog audio signal from the post-amplifier 276. The digitized audio output from the analog-to-digital converter 284 is sent to an audio data storage or fifth first in/first out memory 288 to be written therein for subsequent access and reading for the purpose of compressing such audio information. Control of the analog audio signal conversion, as well as monitoring and control of the fifth memory 288 is achieved using a sixth state machine controller 292. In one embodiment, the 0–5 volt level analog audio signal is digitized at 8000 samples/second. The sixth state machine controller 292 generates sampling clock signals to sample the analog signal and to initiate the analog-to-digital conversion and also causes the writing of the converted digital data into the fifth memory 288.

In connection with the compression of the digitized audio information, it is first transformed from the time domain to the frequency domain using an audio one-dimensional fast cosine operator unit 296 having a fast cosine operator data base 300. Also included as part of the fast cosine operator unit 296 is a 16-bit multiplier and accumulator 304, which receives 8-bit audio data words or points from the fifth memory 288. A seventh state machine controller 308 controls the transfer of data from the fifth memory 288 to the 16-bit multiplier and accumulator 304 and also controls the sending of the data from the data base 300 to the 16-bit multiplier 304. The operation of the 16-bit multiplier 304 is also controlled by the seventh state machine controller 308. The results of the one dimensional cosine transformation are stored in a third random access memory 312. In connection with the transformation, it is conducted in the same manner as the row-wise transformation previously described with regard to the row transformation unit 184, except audio information is being transformed, instead of video information. The [B] matrix associated with the audio transformation has the same matrix elements or data as the [B] matrix for the video cosine transformation. The transformed audio data matrix [E] is determined by the multiplication of the inputted audio data, defined using matrix [A], with the [B] matrix, i.e., [E]=[B]*[A]. A column-wise transformation of audio information is not necessary to achieve a suitable time to frequency transformation using the inputted audio information. In one embodiment, 256 8-bit data words or points of voice data are converted from time domain to frequency domain data. The 256 audio data words correlate with a matrix of 256×1, which constitutes a one-dimensional matrix that is preferred for providing a balance between desired audio data compression and maintaining high quality audio information in the embodiment where the audio analog signal is sampled at 8000 samples/sec.

Similar to the compression of video data, the output from the one-dimensional fast cosine operator unit 296 is subsequently processed for compressing the same before transmission. That is, the output from the third random access memory 312 is applied to an audio coefficients selector unit 316 for determining which coefficients of the inputted 256 16-bit data words have the greater magnitudes of energy for outputting them to an audio coefficients converter or square root extractor unit 320. In the embodiment described, the 256 16-bit words are reduced to 50 16-bit words having the greater energy for input to an audio coefficients converter/ encoding or square root extractor unit 320. The audio coefficients selector unit 316 therefore compresses the audio information by a factor of about 5 (256/50). The audio square root extractor unit 320 further compresses the audio information in a manner comparable to the video square root extractor unit 232 so that the inputted audio information is further compressed by another factor of two. The output of the audio square root extractor unit 320 is applied to an audio subtractor unit 322 and a previous audio data storage or sixth first in/first out memory 324. Like the video channel, the audio subtractor unit 322 basically compares current and just previously sent audio information by taking the difference between the previous audio information stored in the sixth memory 324 and the current audio information outputted by the audio square root extractor unit 320. The result of this difference is fed to an imaginary data storage or seventh first in/first out memory 326. The audio subtractor unit 322 acts to further compress the inputted audio information by a factor of two.

An eighth state machine controller 328 is used to control the timing and transfer of frequency domain audio information for the desired compression and eventual storage in the seventh memory 326. In particular, the eighth state machine controller 328 controls the timing and transfer of audio data from the third random access memory 312 to the audio coefficients selector unit 316. It also controls the operation of the coefficients selector unit 316 and that of the audio square root extractor unit 320. The eighth state machine controller 328 further controls the subtraction operation including the timing and transfer of audio data to and from the sixth memory 324 so that the comparison determination can be properly made between successive audio information data points. Additionally, the controller 328 controls the writing of audio information into the proper locations in the seventh memory 326, as well as monitoring the contents thereof.

The digitized compressed audio information stored in the seventh memory 326 is next fed to the video/audio data mixer 248. In the preferred embodiment, such audio information is sent as imaginary numbers to the fast Fourier operator 252. The fast Fourier operator 252 performs a fast Fourier operation using the inputted video data as real numbers and the inputted audio data as imaginary numbers. The output of the fast Fourier operator 252 is a set of complex numbers, which are stored in a video/audio first in/first out memory 332. The fast Fourier transformation is a well-known mathematical technique for obtaining complex numbers in digital format using inputted real and imaginary numbers. The video/data mixer 248 also includes a ninth state machine controller 336, which controls the transfer and timing of the real and imaginary video and audio data to the fast Fourier operator 252, as well as controlling the steps performed by the fast Fourier operator 252. Transfer of the outputted complex numbers to the video/audio memory 332, as well as monitoring its contents, is achieved using the ninth state machine controller 336.

Figure 5:
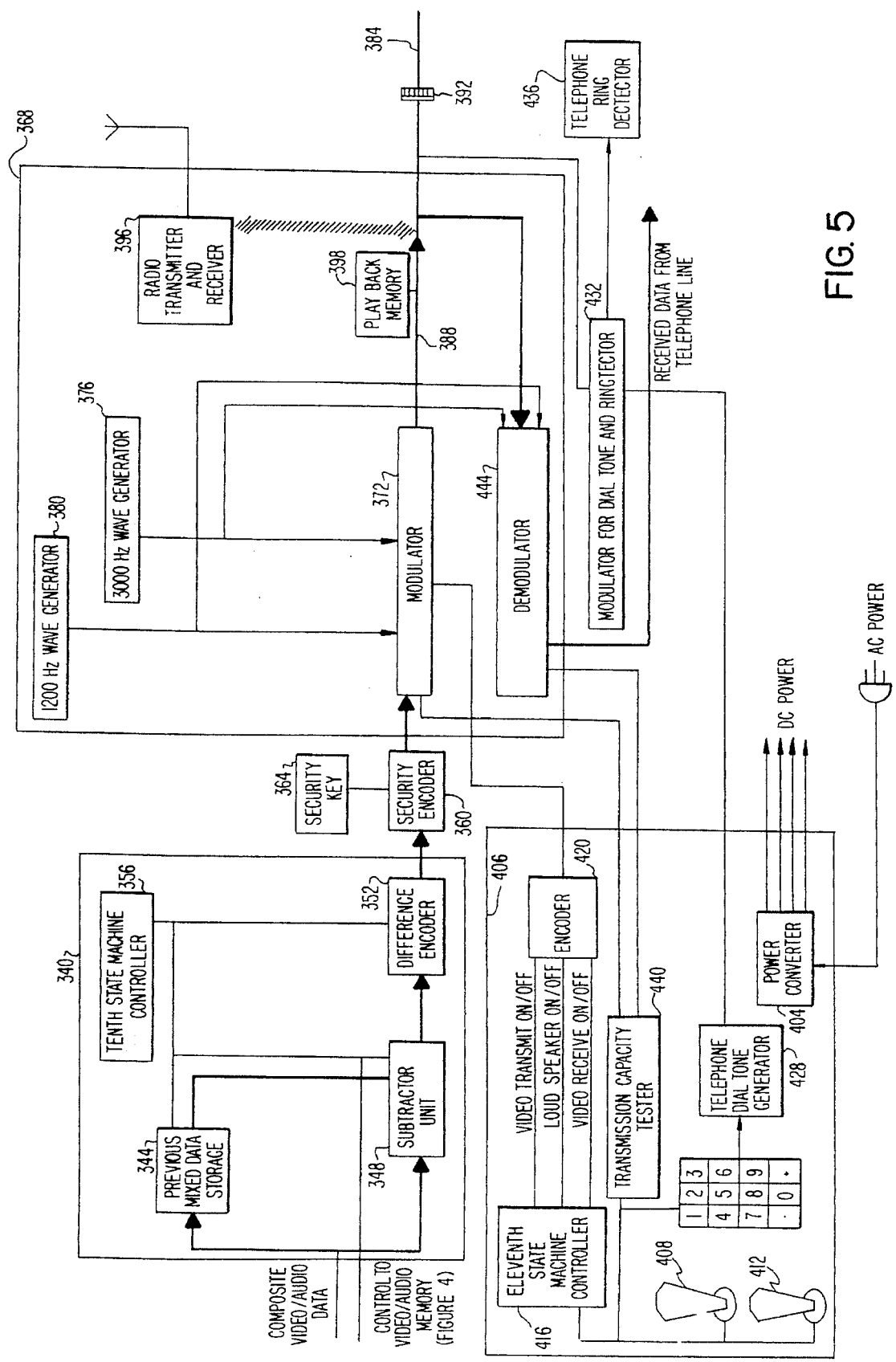
FIG. 5 is a block diagram illustrating further details of the adaptive differential pulse coding unit and modulator unit, as well as schematically illustrating a telephone control board.

The mixed video/audio data stored in the memory locations of the video/audio memory 332 is further compressed using an adaptive differential pulse coding unit 340. As seen in FIG. 5, the coding unit 340 includes a previous mixed data storage 344 for storing mixed data from the previously received mixed video/audio data, which includes the previous image frame and audio information accompanying such video information. The coding unit 340 also includes a subtractor unit 348 for receiving the mixed video/audio information from the video/audio memory 332. The data stored in the previous data storage 344 is compared with or subtracted from the current mixed data using the subtractor unit 348. This operation results in outputting only mixed video/audio data that is different from the mixed data, which was previously sent. Such a comparison substantially reduces the amount of redundant mixed data that is to be transmitted over the ordinary telephone lines and therefore reduces the amount and rate of mixed data that needs to be sent to accurately represent the mixed video information and audio information. As a practical matter, during most of the time when the speaking party is talking on the telephone, most of the image data that is being transmitted is not changing. Consequently, the difference between previous and current mixed data sets will approach zero, except for the difference due to audio or motion relaxed information. To take advantage of such slight differences between current and previous information for transmission purposes, the pulse coding unit 340 also includes a difference encoder 352, which receives the output from the subtractor unit 348. In one embodiment, the difference encoder 352 encodes the inputted mixed data to a fewer number of bits using run length coding methods. In accordance with this method, a count is made as to how many consecutive data words have the same value. Upon determining how many have the same value, the data can be encoded to compress the same before transmission. By way of example, if it is determined that there has been essentially no change over the previous transmission for a determined amount of time, this might be represented as five consecutive 8-bit data words or points, which comprises a total of 40 bits. This information could be encoded such that the first byte of an 8-bit word is 0 and the second byte of the same 8-bit word is coded as 5 to indicate 5 bytes of consecutive zeros. By this example, the number of bits that are required to be sent to provide the video and audio information is 16 bits 2 bytes), instead of 40 bits. The difference encoder 352 also adds a synchronization code to the coded block data so that the receiving station can identify the starting and ending of the real mixed data stream. The difference encoder 352 also adds one data word to the data stream to indicate the total number of data words sent in a current frame or block of mixed data.

A tenth state machine controller 356 is in electrical communication with the previous data storage 344, the subtractor unit 348 and the difference encoder 352 for controlling their operations and the inputting of mixed video/audio data thereto. The tenth state machine controller 356 also controls the transfer of the mixed video/audio data from the mixed video/audio memory 332 and functions simultaneously with the other state machine controllers including the ninth state machine controller 336 for achieving the desired simultaneous operations associated with the processing, including compression, and transmission of video information and audio information.

As seen in FIG. 5, in the preferred embodiment, the video telephone system 100 also includes a security encoder 360 for receiving the encoded mixed video/audio information outputted by the difference encoder 352. A security key 364 communicates with the security encoder 360, with the security key 364 being preferably a 16-bit data register which stores a user-selected security code. The security code is inputted to the security encoder 360 to encode the mixed data received by the security encoder 360. The desired or expected called party would be apprised of the security code so that the called party can use it in decoding the transmitted video information and audio information. Normally, the security code may be changed on a regular basis, such as on a daily basis, so that it is more difficult to decipher the transmitted video and audio data, if an unauthorized person were to tap or otherwise access the telephone lines along which the mixed data is sent.

Before transmission of the mixed data stream, a carrier frequency is provided that is modulated by the inputted mixed data from the security encoder 360. This is accomplished using a modulator unit 368, which includes a modulator 372 for receiving the encoded mixed video/audio data. The modulator 372 modulates a carrier wave having a predetermined frequency using the inputted mixed data. In one embodiment, the modulator 368 includes a 3000 Hz wave generator 376, which inputs a carrier wave to the modulator 372 having a 3000 Hz frequency. A 1200 Hz wave generator 380 is also provided for inputting a carrier signal having a 1200 Hz frequency to the modulator 372. One of these two carrier waves is utilized as the carrier frequency for transmitting the mixed data. In one embodiment, the 3000 Hz wave carrier is used when the mixed data is generated by the person who originated the telephone call and the 1200 Hz wave is modulated by the mixed data when such mixed data was generated by the person responding to the originating call. With the use of two different carrier frequencies, the source of the mixed data can be readily determined. The output of the modulator 372 is fed to the ordinary voice grade telephone line 384 using conventional cable 388 and a telephone interface or standard RJ-11 type connector 392. In the case in which the modulated wave is to be transmitted over a radio link, the modulated wave is fed to a radio transmitter and receiver unit 396. It should also be appreciated that the modulated wave could also be sent to a printer, magnetic media, volatile memory, non-volatile memory, and any other playback memory 398 for storage and subsequent retrieving for playback purposes. It should be further understood that a playback memory could be located to store compressed video/audio data when such is received after transmission over the telephone lines.

With regard to installation and initializing use of the video telephone system 100, as illustrated in FIG. 5, a power cable 400 is connected to a standard electrical outlet, which cable 400 supplies power to a power converter 404. The power converter 404 is part of a control panel or board 406 and is used to convert the AC input power to predetermined DC voltage levels, e.g., ±5 VDC and ±12 VDC. The DC voltages are used to power the parts and components of the video telephone system 100 that require such electric power. A video switch 408 is provided to either enable or disable the transmission of video information or images to a calling or receiving station. The control panel 406 also includes a speaker switch 412, which is used to turn off the loud speaker for privacy when a handset is used for telephone conversations. The output from each of these two switches 408, 412 is applied to an eleventh state machine controller 416 for controlling the use of such inputs including providing signals indicative of the states of these two switches. In that regard, the output of the eleventh state machine controller 416 is sent to an encoder 420 for encoding such information in a format that is understood by the telephone receiving station. The output of the encoder 420 is fed to the modulator 372 so that such information can be relayed to the receiving station in the form of a modulated carrier wave and before the transmission of the mixed video/audio data. The telephone control board 406 also includes a standard telephone key pad 424 which is used to dial or input the telephone number that is to receive the video and/or audio transmission. Associated with the telephone key pad 424 is a telephone dial tone generator 428 for producing a dial tone, which is used to modulate a carrier wave using a modulator for dial tone and ring detector 432. The output of the modulator 432 is applied to the telephone cable 388 for transmitting the modulated wave having dial tone information along the ordinary telephone line 384. Additionally, a telephone ring indicator 436, which communicates with the modulator 432, is used to provide an indication that the video telephone is being accessed or ringing.

In order to insure that the ordinary voice grade telephone line or lines 384 have the capacity to receive the expected to be transmitted video information and/or audio information, the control panel 406 includes a transmission capacity tester 440. The tester 440 tests the maximum capacity of a telephone line to transmit data at any predetermined time. To accomplish such testing, the tester 440 places the video telephone system 100 into a remote loop back mode by sending a predetermined, unique code to the receiving station. The transmission capacity tester at the receiving station intercepts the incoming predetermined code and places the receiving station in loop back mode. As a result, the receiving station sends all transmitted data back to the transmitting unit until loop back mode is terminated by the transmitting station. Once the receiving station is in the loop back mode, the sending station combines a 16-bit word into one cycle of analog data and sends it to the receiving station. The receiving station sends the received data back to the sending station. The data received back at the sending station is compared with the data originally sent. If the data received is not the data that was sent, then it is determined that the telephone line is unable to send a 16-bit word or data point in one cycle. If such a determination is made, a 16-bit data word is sent in two cycles, with an 8-bit word being sent per analog cycle, to the receiving station. The receiving station once again returns the sent data back to the sending station, which is compared with the two 8-bit words that were just sent. If there is no match based on the comparison, then 4 bits per cycle are sent. Using four cycles, 16 bits of data are sent again to the receiving station. This testing can be continued with two bits per cycle and one bit per cycle. When a match between transmitted and received data is achieved, the number of bits used to achieve that match indicates the maximum data transmission capacity of the telephone line. In the foregoing examples, the transmission capacity tester 440 determines whether 48,000, 24,000, 12,000, 6,000 or 3,000 bits/second can be sent with a 3,000 Hz carrier wave. It also verifies whether 19,200, 9,600, 4,800, 2,400 or 1,200 bits/second can be sent using 1,200 Hz as a carrier wave. The bits of data or data stream used for testing the telephone line capacity includes five unique 16-bit data words that are also used as a diagnostic test pattern which can detect any stuck high, stuck low or shorted digital signal lines involved within the telephone interface electronics. The eleventh state machine controller 416 controls the operation of the transmission capacity tester 440 and is used in making the determination as to the capacity of the telephone line or lines along which the expected to be transmitted video information and/or audio information is to be provided.

Figure 6:
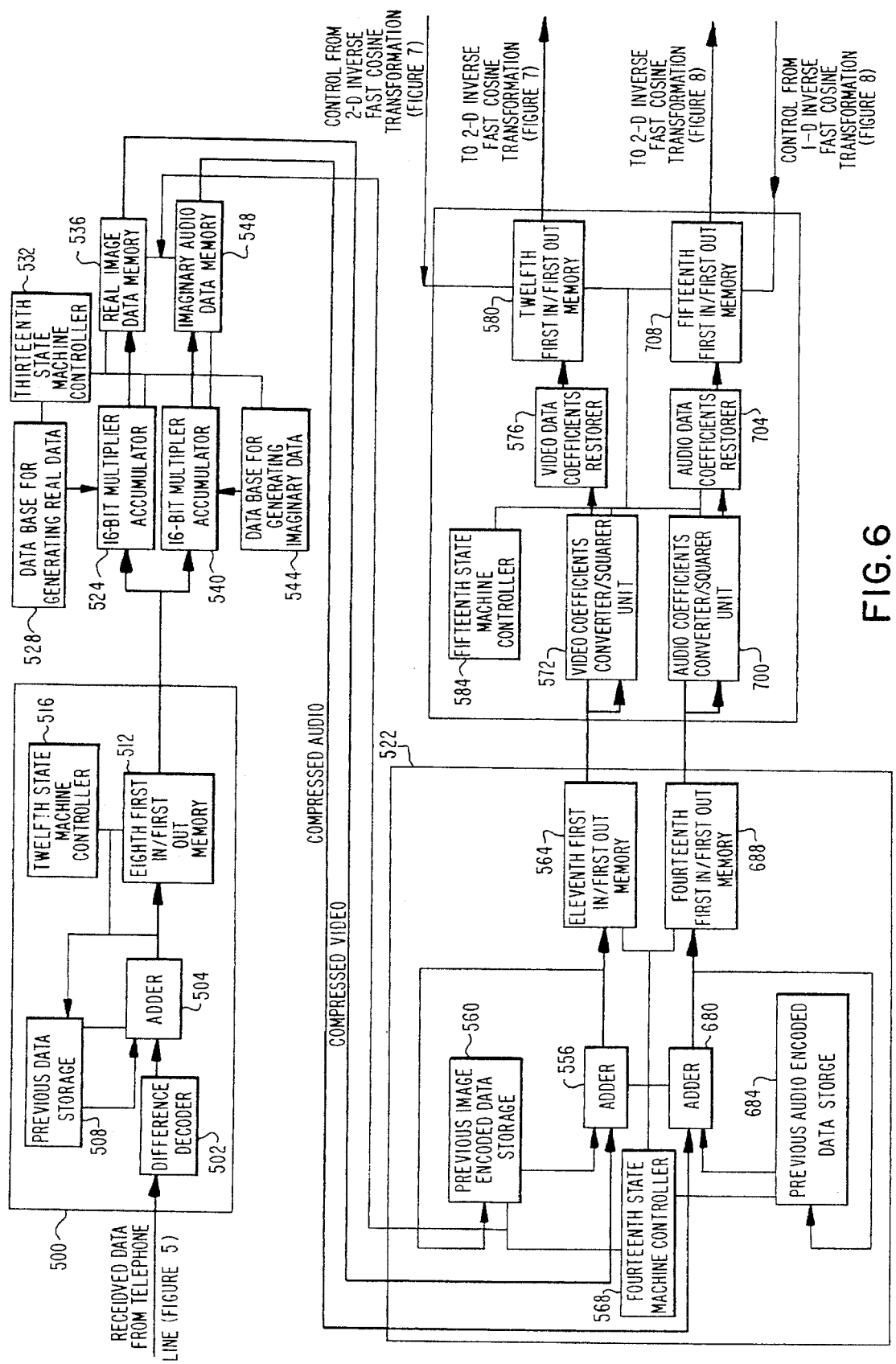
FIG. 6 illustrates further details of the video and audio receiving channels including the adaptive differential pulse decoder unit, the audio and video data separator, the video frame difference restorer, and video and audio multipliers and coefficients restorer units.
Figure 7:
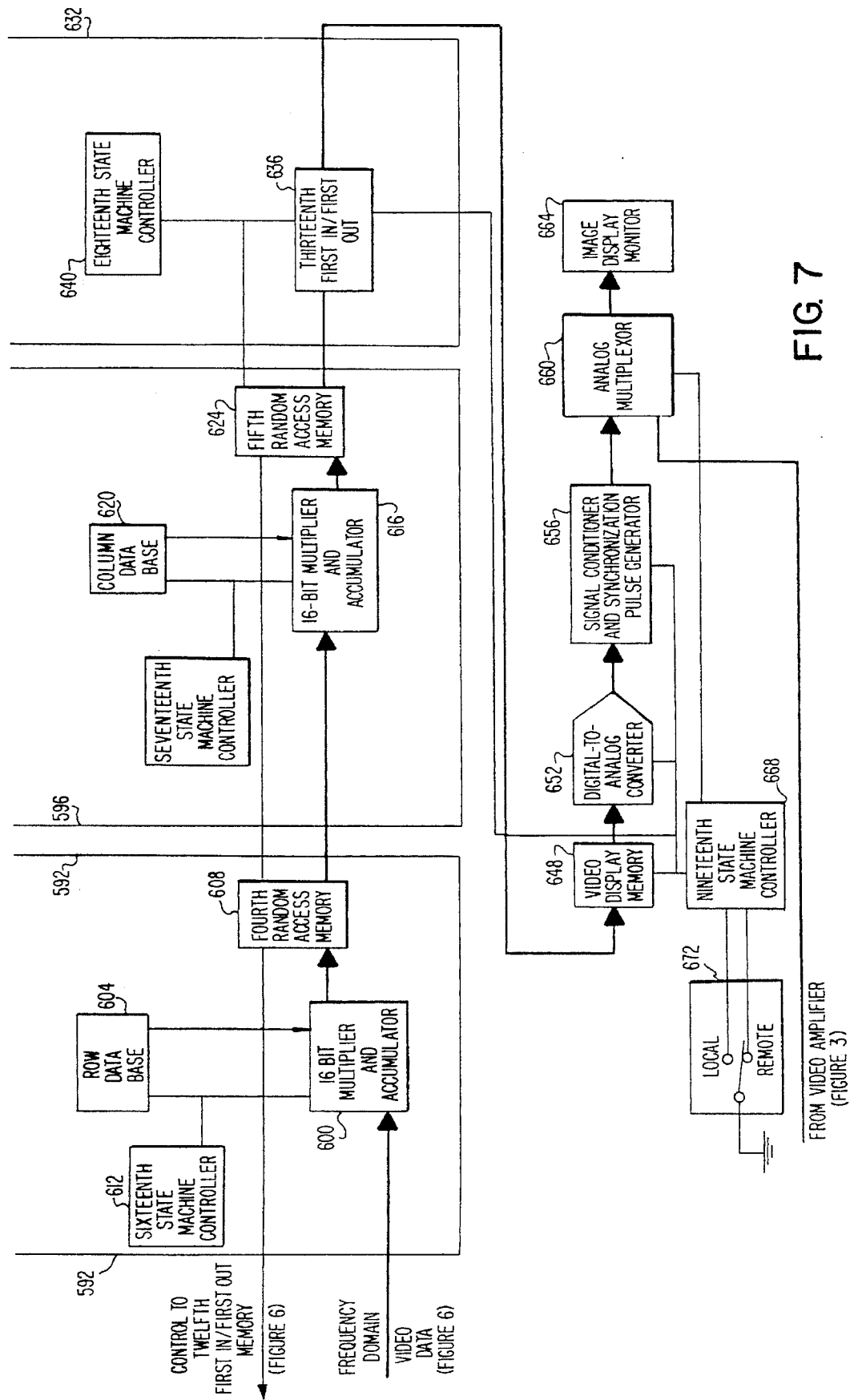
FIG. 7 is a block diagram illustrating further details of the video receiving channel two-dimensional inverse cosine transform operator unit, image magnifier unit and video display interface.
Figure 8:
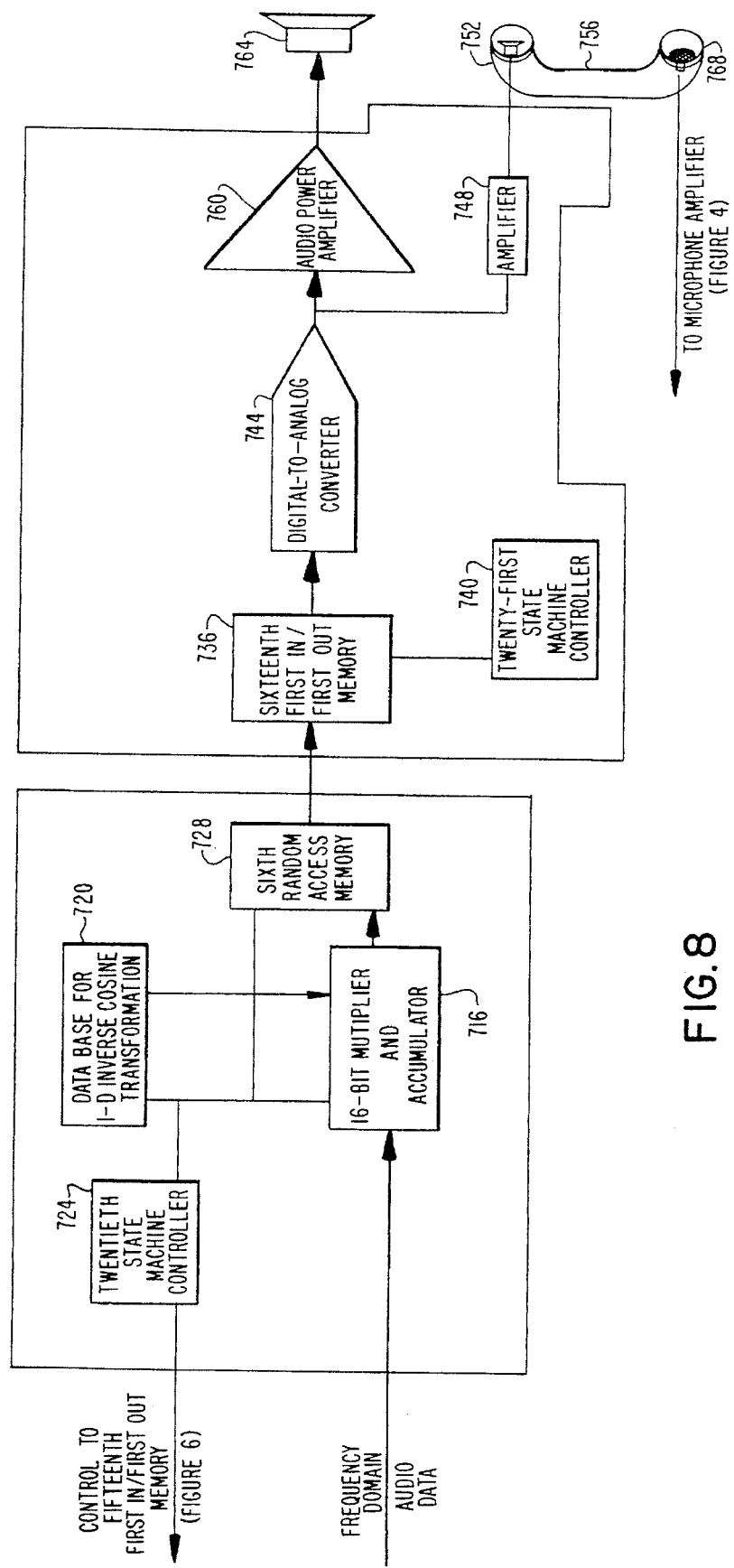
FIG. 8 is a block diagram illustrating further details of the audio receiving channel including the one-dimensional inverse cosine transform operator unit and the speaker and handset interface.

With the generation of the compressed video information and compressed audio information having been described, reference is now made to FIGS. 6–8 for a discussion of the video and audio receiving channels that receive the mixed video/audio data from the ordinary telephone line or lines and process the same, including decompression or expansion, so that the images and the sounds provided by the transmitting party can be seen and heard by the receiving party. The modulated carrier wave must first be demodulated to recover the compressed mixed video/data information. Such demodulation is achieved by a demodulator 444, which is illustrated in FIG. 5 as being associated with the previously described transmitting station. As can be understood, both the call originating station and the call responding station must each have transmission and reception capabilities. Consequently, the demodulator 444 at the transmitting station includes the same components and functions in the same manner as a demodulator, which is part of the video telephone system 100 at the receiving station. The demodulator 444 removes the intelligence, i.e. mixed video/audio data, from the carrier frequency after being received from the ordinary telephone line 384. The mixed video/audio data can then be decompressed or expanded using a number of expansion methods, comparable to the methods utilized in compressing the data.

As seen in FIG. 6, the mixed video/audio data is first applied to an adaptive differential pulse decoder unit 500. The pulse decoder unit 500 essentially reverses the function or process performed by the pulse coding unit 340 and regenerates the same data that was inputted to the pulse coder 340. The pulse decoder unit 500 includes a difference decoder 502 that receives the mixed video and audio data from the ordinary telephone line 384 and decodes the mixed data so that the data is outputted therefrom in essentially the same form that it had when it was inputted to the difference encoder 352. The output of the decoder 502 is delivered to an adder 504 for adding currently received mixed data to mixed video/audio data previously stored in previous data storage 508. The previous data storage 508 stores previously received mixed data including data that was found to be redundant or the same as mixed data that is now being transmitted. The adding of the previous data to the current data by means of the adder 504 results in an output comparable to the input to the subtractor unit 348. This regenerated mixed data is written into an eighth first in/first out memory 512. The output of the adder 504 is also sent to the previous data storage 508 for use in combining with the next block of mixed data. A twelfth state machine controller 516 controls the operation of the decoder unit 502 and the adder 504, as well as the transfer of expanded, mixed data to the previous data storage 508 and the eighth memory 512. The twelfth state machine controller 516 also monitors the contents of the eighth memory 512 to determine whether storage space is available for the expanded mixed data outputted by the adder 504.

The receiving section of the video telephone system 100 also includes a one-dimensional inverse fast Fourier transform unit 520. Similar to the pulse decoder unit 500, the inverse transform unit 520 reconstructs the video information and audio information that was inputted to the video/audio data mixer 248. Accordingly, the inverse transform operator provides separate compressed video information and audio information. The unit 520 includes two separate channels, each of which receives the same input from the eighth memory 512. In conjunction with the video information channel, the mixed data stream from the eighth memory 512 is inputted to a 16-bit multiplier accumulator 524. Also inputted to the multiplier accumulator 524 is data stored in the data base for generating real data 528. Under control of the thirteenth state machine controller 532, the mixed data from the eighth memory 512 and data from the data base 528 are applied to the multiplier accumulator 524 to perform the inverse transform function, as is well known in the art. The inverse transform, performed using the multiplier accumulator 524, results in obtaining real number portions of complex numbers, which are then stored in a real image data or ninth first in/first out memory 536. The thirteenth state machine controller 532 controls the transfer of the real number portions to the ninth memory 536, as well as monitoring its contents. The compressed video information stored in the ninth memory 536 corresponds to the compressed video information inputted to the video/audio data mixer 248.

With respect to the channel for obtaining or separating the compressed audio information from the mixed data stream, the 16-bit multiplier accumulator 540 receives the inputted mixed data stream from the eighth memory 512. An inverse fast Fourier transform is performed on this inputted data using the data from the data bate to generate imaginary data 544, under the control of the thirteenth state machine controller 532. The results of this inverse transform are imaginary number portions of the complex numbers set outputted by the two multiplier accumulators 524, 540. The imaginary number portions are written into an imaginary audio data or tenth first in/first out memory 548. As with the video information separating channel, the thirteenth state machine controller 532 also controls the transfer of separated, compressed audio information to the tenth memory from the multiplier accumulator 548 and checks the contents of the tenth memory to insure that proper storage of the separated compressed audio information is made.

To further expand the received video data, now separated from the audio data, a frame to frame difference restorer 552 is provided. This restorer 552 restores video image information that had previously been removed using the subtractor unit 240 prior to transmission of the video information. To accomplish the restoration, it is necessary that previous video information be combined with current video information. More particularly, the frame difference restorer 552 includes an adder 556 for receiving the separated compressed video information in the form of 8-bit words or data points. The adder 556 combines the current video data with previously received video data that was found to be redundant and which had previously been removed by the subtractor unit 240 during compression of the video data before transmission. With regard to previous image data, a previous image encoded data storage 560 is provided, which has memory locations corresponding to each of the elements of the 32×32 matrix of video information so that the output, after video information associated with one frame has been sent to the adder 556, is a frame of video data of 32×32 elements, each having 8 bits and which are stored in an eleventh first in/first out memory 564. A fourteenth state machine controller 568 electrically communicates with the eighth memory 536 for controlling the transfer of separated compressed video information therefrom to the adder 556. The fourteenth state machine controller 568 also controls the operating steps performed by the adder 556 and the transfer of video information to the previous image data storage 560, as well as obtaining such data for inputting to the adder 556. Similar to other state machines, the fourteenth state machine controller 568 also monitors the contents of the eleventh memory 564 and writes the 8-bit video data into the proper locations of the eleventh memory 564.

Continuing the description of the video information receiving channel, the video telephone system 100 also includes an 8-bits to 16-bits coefficients converter or multiplier, preferably a squarer, unit 572 for squaring each of the 8-bit data points stored in the tenth memory in order to store or decode the 8-bit video data words to 16-bit words. This expansion is followed by a further expansion using a video data coefficients restorer 576. Specifically, the restorer 576 receives the results of the multiplier 572 in the two-dimensional square format. The 400 coefficients which were selected by the coefficients selector unit 224 are decoded to their meaningful values and stored at appropriate locations in a two-dimensional, 32×32 memory array, corresponding to one frame of a video image. The remaining 624 locations of the 32×32 array (1024 locations) are zeroed out. The results of the video data coefficients restorer 576 are written into a twelfth first in/first out memory 580 which, for each frame of video, uses 32×32 memory locations. Similar to the restorer 576, which decodes the video information previously compressed by the coefficients selector unit 224 before transmission, the multiplier unit 572 restores or reverses the operation of the square root extractor unit 232. In conjunction with properly controlling these expansion modes or methods, a fifteenth state machine controller 584 is provided for controller the transfer of compressed video data from the eleventh memory 564 to the multiplier 572 and subsequent transfers to the restorer 576 and the twelfth memory 580. Additionally, the fifteenth state machine controller 584 controls the operating steps associated with the multiplier unit 572 and the restorer 576, as well as monitoring the contents of the twelfth memory 580 and writing the expanded video data into the proper locations in the twelfth memory 580.

With reference to FIG. 7, the video telephone system 100 video receiving channel further includes a two-dimensional inverse fast cosine transformer unit 590 for converting the video information from the frequency domain to the time domain. To implement this transformation or conversion, an inverse row transform unit 592 and an inverse column transform unit 596 of the transformer unit 590 are employed. Each of the units 592, 596 inverse transforms or decodes the inputted video information that had been previously transformed in the video transmitting channel using the row transform unit 184 and the column transform unit 188, respectively. The inverse row transform unit 592 includes a 16-bit multiplier and accumulator 600 for receiving sequentially, in connection with each frame of a video image, 32×32 16-bit data words. Electrically communicating with the multiplier and accumulator 600 is a row data base 604 which has stored therein data for performing the inverse transformation by rows. In particular, the data base 604 includes the matrix elements associated with the $[B]^T$ matrix. The inputted video information to the multiplier and accumulator 600 constitutes the restored 16-bit coefficients and, for each frame of video data, can be defined as a 32×32 [C]' matrix. The result of the inverse transform is a 32×32 [R'] matrix. The elements of the [R'] matrix are written into and stored in a fourth random access memory 608. The elements of the [R'] represent regenerated or reproduced video data. A sixteenth state machine controller 612 controls the timing and transfer of the video information from the twelfth memory 580, the operation of the inverse row wise transform and the writing of the results into the fourth random access memory 608.

To complete the inverse transformation, the elements of the [R'] matrix are serially transferred to a 16-bit multiplier and accumulator 616. Like the multiplier and accumulator 600, the multiplier and accumulator 616 performs the necessary multiplications and additions for implementing the inverse column wise transformation of the inputted video data. This is accomplished in conjunction with data inputted from the column data base 620, which is multiplied with the data from the fourth random access memory 608. Specifically, the data from the data base 620 includes the elements of the [B] matrix. As a result of this inverse transformation, and outputted by the multiplier and accumulator 616, is one frame of video data, i.e., a 32×32 [V'] matrix, whose elements represent time domain video information. The [V'] matrix is obtained as a result of the computation of [R']*[B]. The elements of the [V'] matrix are written into a fifth random access memory 624 and, with respect to a 32×32 frame, such video information is substantially similar to the original image that was obtained by the camera device 104 at the transmitting station, except that it must be magnified or restored to the original image size. A seventeenth state machine controller 628 controls the transfer of row wise transformed video data from the fourth random access memory 608 to the multiplier and accumulator 616, as well as the outputting of elements of the [V'] matrix to the fifth random access memory 624. The seventeenth state machine controller 628 further controls the operation of the multiplier and accumulator 616 including the transfer of data from the data base 620, which is used in the performance of the inverse cosine transformation by columns.

To restore the time domain video information to the image size previously obtained using the camera device 104, an image magnifier 632 communicates with the fifth random access memory 624. The image magnifier 632 expands or magnifies the inputted video data so that, in the embodiment in which a frame of 32×32 elements has been generated and stored in the fifth random access memory 624, a 96×96 resulting matrix or frame of video information is achieved. The image magnifier 632 includes a thirteenth first in/first out memory 636 for receiving, under the control of an eighteenth state machine controller 640, the video information to be magnified. The image magnifier 632 uses a bi-directional interpolation method for expanding the inputted video data to a 96×96 image size. Each of the elements of the 96×96 frame is now 8-bit data words, in the case of a monochrome image, and 15-bit data words, in the case of a color image being transmitted. The bi-directional interpolation method essentially restores or decodes video data that had previously been removed as a result of the averaging that had been done by the spatial mode image compression unit 156.

To display the received images, the magnified video information is controllably applied to a video display interface 644, which includes a video display memory 648 into which the magnified video information is written. The digital video information stored in the video display memory 648 is fed to a digital-to-analog converter 652 for converting the digital video information back to an analog video signal that includes the video information. The signal conditioner and synchronization pulse generator 656 receives the analog video signal and adds synchronization pulses, namely, horizontal and vertical blanking pulses, color level adjusting signals and any other standard video information that is useful or necessary in properly displaying the inputted video information. The output of the pulse generator 656 is fed to an analog multiplexer 660 for subsequent transfer to an image display monitor CRT or LCD 664. The operation of the video display interface 644 is controlled by a nineteenth state machine controller 668, which electrically communicates with each of the components of the video display interface including the video display memory 648, the digital-to-analog converter 652, the signal conditioner and synchronization pulse generator 656 and the analog multiplexer 660. The nineteenth state machine controller 668 also controls the timing and transfer of the magnified or expanded video information from the thirteenth memory 636 for storage into the video display memory 648. In addition to the display of images received from a transmitting station, the image display monitor 664 is also able to display images being transmitted by the transmitting station. That is, instead of displaying received images, the image display monitor 664 can display transmitted images so that the sending party is able to see the images actually being transmitted. This capability is implemented using a video display mode selection switch 672, whose input is applied to the nineteenth state machine controller 668. When the switch 672 is in a first state, the image display monitor 664 displays the images being received from a transmitting station. When the switch 672 is in a second state, the image display monitor 664 displays images being transmitted. In that instance, the analog multiplexer 660 receives the amplified audio video signal from the video amplifier 140 of FIG. 3. The analog multiplexer 660 then acts to pass this video signal to the image display monitor 664, instead of the analog video signal that may be received from another video telephone transmitting station. In one embodiment, a display playback memory 674 is provided for storing expanded video data (see FIG. 2), which can be viewed later or stored for a record-keeping purpose.

Returning back to FIG. 6, a description of the expansion of the separated compressed audio information is now provided. The compressed audio information is being expanded simultaneously with the expansion of the compressed video and such expansion is controlled using the same state machine controllers 568, 584 as controlled certain of the expansion steps of the video information. The compressed but separated audio information, in accordance with the embodiment disclosed, includes 25 8-bit data points. This audio information is serially applied to an adder 680 of the difference restorer 552, which also includes a previous audio encoded data memory 684. The memory 684 stores previously received audio data and expands or restores audio data so that it corresponds to the audio data as it existed when it was inputted to the audio subtractor unit 322. Thus, the memory 684 includes audio data that was determined to be the same as previously sent audio data by the operation of the audio subtractor unit 322 and the memory 324. This stored audio data is added to the currently received audio data by the adder 680, under the control of the fourteenth state machine controller 568. The result of the addition is sent to a fourteenth first in/first out memory 688, also under the control of the fourteenth state machine controller 568. The adder operation expands the inputted audio information by a factor of two so that 50 8-bit data points are stored in the memory 688.

Under the control of the fifteenth state machine controller 584, the audio information from the fourteenth memory 688 is next controllably inputted to an 8-bit to 16-bit audio coefficients converter or multiplier, preferably a squarer, unit 700 that decodes each inputted 8-bit data point to a 16-bit data point. The multiplier unit 700 restores or reverses the audio information to the content it had when it was inputted to the audio square root extractor 320. Also under the control of the fifteenth state machine controller 584, the resulting 16-bit data points are next applied to an audio data coefficients restorer 704. The restorer 704 decodes the inputted audio data to output, in the desired embodiment, 256 16-bit data words having audio information. The coefficients restorer 704 essentially reverses the compression method utilizing the audio coefficients selector unit 316 so that expanded audio data is the result. Arithmetic and logical control of the restorer 704 in implementing the necessary steps to obtain the restored coefficients is achieved using the fifteenth state machine controller 584. A fifteenth first in/first out memory 708 electrically communicates with the restorer 704 and the restored coefficients are written into the fifteenth memory 708 in memory locations that can be defined as a one-dimensional 256×1 matrix (256 16-bit data words).

With reference to FIG. 8, to inverse transform the frequency domain voice data to the time domain, a one-dimensional inverse fast cosine transform unit 712 is provided for receiving the expanded audio information from the fifteenth memory 708. The inverse transformation unit 712 essentially reverses the cosine transformation performed by the fast cosine operator unit 296. The expanded audio information is inputted to a 16-bit multiplier and accumulator 716, which is used to implement the inverse transformation, together with data from the data base for one-dimensional inverse cosine transformation 720, which is predetermined data previously stored therein. In performing the inverse transformation, the data base 720 stores elements or numbers constituting the defined $[B]^T$ matrix. The inputted audio information can be defined as a [G] matrix that corresponds to the [E] matrix, previously determined when the audio data was transformed, but having some of the matrix elements of the [E] matrix zeroed out. The reproduced or regenerated audio data is defined as an [A'] matrix, which is determined from the relationship $[A']=[B^T]*[G]$. To arrive at which of the matrix elements of the [E] matrix are "zeroed out," steps are taken to determine the energy content associated with the matrix elements so that only a predetermined percentage of such energy content remains after the zeroing out process. A twentieth state machine controller 724 controls the inputting of the audio information to the multiplier and accumulator 716, as well as the timing and transfer of data from the data base memory 720. The twentieth state machine controller 724 also controls the operation and various steps conducted by the multiplier and accumulator 716 in performing the one-dimensional inverse cosine transformation. The time domain audio information produced as a result of the inverse cosine transformation is written into a sixth random access memory 728 under the control of the twentieth state machine controller 724, which controller also monitors the contents of the memory 728 and controls which memory location that the time domain audio information should be written into. As a result, the sixth random access memory 728 contains 16-bit data points representative of audio information, with 256 such data points, in one embodiment, correlating with the transmission and reception of one frame (96×96 of pixels) of video information.

The expanded digital audio information can then be transmitted to a speaker and handset interface 732 for preparing or conditioning the digitized audio information so that the transmitted sounds can be reproduced at the receiving station. In particular, the interface 732 includes a sixteenth first in/first out memory 736 into which the 16-bit audio data words are serially written under the control of a twenty-first state machine controller 740. Also pursuant to the control of the twenty-first state machine controller 740, the digital audio information is converted to an analog audio signal using a digital-to-analog converter 744. The analog output from the digital-to-analog converter 744, under the control of the receiving party, can be transmitted to a handset speaker amplifier 748, which amplifies the analog audio signal before transmission to the handset speaker 752 of the telephone handset 756. The converted analog audio signal could instead be fed to an audio power amplifier 760, which communicates with a loud speaker 764 so that more than one individual is able to hear the reproduced sounds using the audio information, which is part of the amplified analog audio signal. The telephone handset 756 also includes a microphone 768, which corresponds to the microphone 260 associated with the telephone system of the transmitting station.

As can be understood from the foregoing relating to the compression of video information and audio information and its later expansion by a receiving station, high quality and accurate video images can be transmitted in substantially real time over ordinary voice grade telephone lines, having limited bandwidths. Although other specific embodiments could be implemented using the features of the present invention, in the embodiment described, the video information is first compressed by a factor of 9 using the image reduction unit 156. It is then subject to a 0.8 factor of compression using the two-dimensional coefficients selector unit 224. The video information is then further compressed by a factor of 2 using the video coefficients converter unit 232. The video information is then compressed by an additional factor of about 2 using the subtractor unit 240. Lastly, the video information is compressed by a factor of 2–5 times using the adaptive differential pulse coder unit 332. As a result, the video data words are compressed by a total of 57–144 times. With respect to audio information compression, the audio coefficients selector unit 316 compresses the inputted audio information by a factor of about 5. The audio information is then further compressed by a factor of 2 using the audio square root extractor unit 320. The audio subtractor unit 322 further compresses the audio information by a factor of 2. Since the audio information is also received by the adaptive differential pulse coding unit 332 as part of the mixed video/audio data, the audio information is also compressed by an additional factor of 2–5 times. When considered together, the entire compression of audio data is between about 40–102 times. The video information to be compressed is preferably sampled or selected at a rate that permits the viewer to see images as they occur in substantially real time, while avoiding sampling at a greater rate. It has been determined that a video frame rate of 7–7.5 frames/second achieves this objective. The video telephone system 100 is therefore able to sample video information at this rate and, together with the total video compression as well as the total audio compression, simultaneously transmit audio information and video information over ordinary telephone lines while still achieving high quality and accurate picture and voice reproduction at a telephone receiving station having the video telephone system 100. Additionally, the video information and audio information is transmitted and received asynchronously relative to the functioning and operation of the various processing, compressing and expanding units employed by the present invention. That is, the asynchronous operation means that no system clock is required to synchronize or clock in video and audio information as such is initially received into their respective video and audio transmitting channels, rather, video and audio information is received at the same time based on what is being inputted to the camera device and microphone. Likewise, there is asynchronous transmission of the video and audio information over the telephone lines since the video and audio information is mixed together so that there is no synchronizing clock needed to synchronize the reception of video and audio data. However, the state machine controllers used in the video and audio transmitting channels and the state machine controllers used in the video and audio receiving channels are synchronized and must cooperate together so that the video information received by the display monitor and the audio information received by the speaker are generated so as to reproduce that video and audio information which was inputted at the same time to their respective transmitting channels.

Another embodiment for transmitting and receiving "compressed" audio data involves the use of a linear predictive coding (LPC) system. This system determines magnitudes of parameters using inputted, sampled speech, which parameters are used to synthesize or reconstruct the speech after the parameters have been transmitted to the receiving station. The speech parameters are: vocal tract or LPC coefficients; pitch period for N speech samples of speech; voiced or unvoiced speech; and the gains associated with each pitch period of N speech samples.

Figure 9:
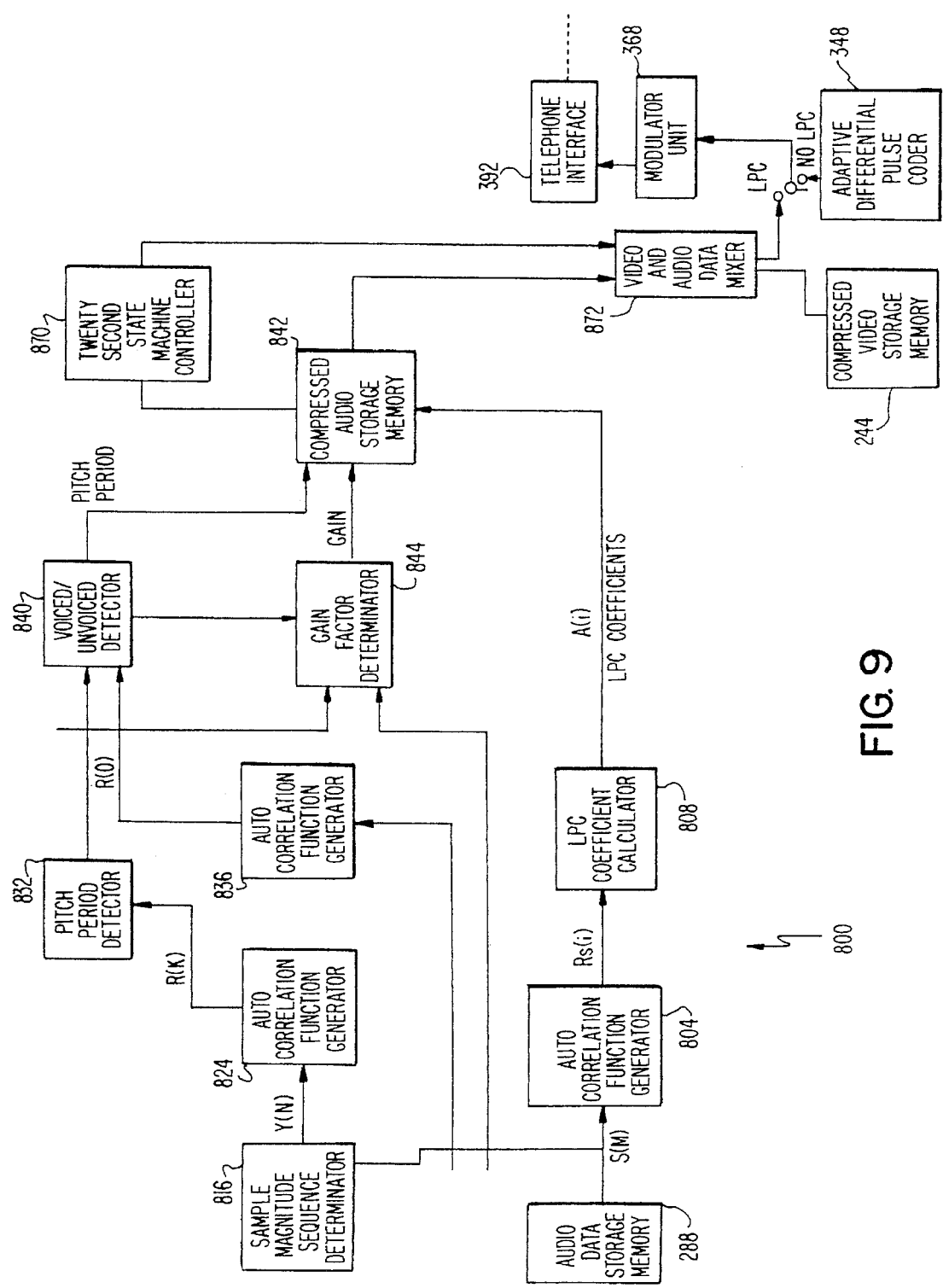
FIG. 9 is a block diagram illustrating another embodiment associated with the transmission of audio data using a linear predictive coding (LPC) coder.

With reference to FIG. 9 and initially the analysis of LPC coefficients, the LPC system includes a LPC coder 800 that receives as its input the audio data stored in the audio data storage memory 288 of FIG. 1. That is, instead of the audio data being inputted to the fast cosine operator unit 296 of FIG. 1, in this embodiment, such data is inputted to the LPC coder 800.

The LPC coder 800 implements a coding technique that is based on the premise that a sample of speech can be approximately defined as a linear combination of previous "p" speech samples, in accordance with the following relationship:

$$S(N) = \sum_{i=1}^{p} A(i) * S(N-i) \quad [1]$$

Where:

S(N)=speech signal;

A(i)=predictor coefficients, with $1 \leq i \leq p$;

p=order of the system and a predetermined value.

In accordance with the foregoing, if the linear predictor coefficients or values of A(i), for i=1 to p, are known, then further speech sample values S(N) can be calculated. The linear predictive coding coder 800 computes these 1 through p predictor coefficients A(i).

In conjunction with the use of the LPC coder 800, it receives digitized speech at a predetermined number of samples/second. The LPC coder 800 processes a predetermined number N of consecutive samples of audio data to determine a predetermined number "p" of linear predictor coefficients A(i). In one embodiment, the value of N can be between 120–1024, with the quality of regenerated speech being higher with a smaller N value but the compression becomes insufficient for a value N too small. A typical value of N is 207. Similarly, greater values for "p" result in better quality of regenerated speech, but at the expense of higher bandwidth requirements to transmit additional predictor coefficients. A typical value for "p" is 8.

With regard to determining the predictor coefficients A(i) by means of the LPC coder 800, autocorrelation coefficients Rs(K) for a "frame" are determined. A "frame" corresponds to N samples of audio data. To determine these coefficients:

$$Rs(K) = \sum_{M=0}^{N-1-K} S(M)*S(M+K), K = 0,1 \ldots p \quad [2]$$

where:

N=no. of samples in the frame

S(M)=speech signal samples p=order of the system

From the determined Rs(K) values, Yule-Walker equations are employed:

$$\begin{bmatrix} Rs(0) & Rs(1) & \ldots & Rs(p-1) \\ Rs(1) & Rs(0) & \ldots & Rs(p-2) \\ \cdot \\ \cdot \\ \cdot \\ Rs(p-1) & Rs(p-2) & \ldots & Rs(0) \end{bmatrix} \begin{bmatrix} A(1) \\ A(2) \\ \cdot \\ \cdot \\ \cdot \\ A(p) \end{bmatrix} = \begin{bmatrix} Rs(1) \\ Rs(2) \\ \cdot \\ \cdot \\ \cdot \\ Rs(p) \end{bmatrix} \quad [3]$$

where:

Rs(K)=autocorrelation coefficients

A(i)=LPC coefficients p=order of the system

The Yule-Walker equations are solved using Durbin's recursive solution as follows:

$$E^{[o]}=R(O) \quad [4]$$

$$K(i) = \left[ R(i) - \sum_{j=1}^{i-1} A(j)^{[i-1]}*Rs(i-j) \right] /E^{[i-1]}, 1 \leq i \leq p \quad [5]$$

$$A(i)^{[i]}=R(i) \quad [6]$$

$$A(j)^{[i]}A(j)^{[i-1]}-K(i)*A(i-j)^{[i-1]} \quad [7]$$

$$E^{[i]}=(1-K(i)^2)*E^{[i-1]} \quad [8]$$

The nomenclature of the above equations, [4]–[8], includes the use of variables in parenthesis, e.g. (j), and variables at upper scripts found in brackets ([,]) e.g. [i]. Such nomenclature indicates an element in a matrix with the parenthesis term indicating the column and the bracketed term indicating the row, e.g., the jth term in the ith row.

The foregoing equations are solved recursively for i=1,2, . . . p to achieve the final solution:

$$A(j) =A(j)^{[p]}, 1 \leq j \leq p \quad [9]$$

Where A(j)'s are the linear predictor coefficients, which are found in the pth row of the solution matrix and can be redefined again as the A(i) coefficients.

With reference to FIG. 9 in implementing this recursive method, the digitized audio data is inputted to an auto correlation function generator 804 for automatically correlating successive input speech signals, which are represented by S(M) and S(M+i), to output a predetermined number of Rs(i) values, based on the predetermined value N (equation [2]).

In connection with determining the predictor coefficients themselves, the Rs(i) values are then inputted to a LPC coefficient calculator 808 that determines and outputs each of the LPC coefficients A(i). To accomplish this determination, the afore-defined equations [3]–[9] are implemented preferably using state machine techniques for rapid processing and solving of the equations.

In addition to their use in determining Rs(i) values and subsequently LPC coefficients A(i), the sampled speech data is also utilized in determining the pitch period. Specifically, the audio data samples S(M) are inputted to a sample magnitude sequence determinator 816. This unit receives the inputted speech data and prepares it for autocorrelation thereof in finding the pitch period. The use of the determinator 816 is based on the recognition that a voiced speech signal is close to "periodic." An autocorrelation of the inputted speech data is a satisfactory technique for determining the period. Contrariwise, unvoiced speech is not periodic. Consequently, in the case in which the speech is unvoiced, the pitch period is set to zero to indicate to the receiving station that the frame of speech is unvoiced.

In the case in which the speech is voiced, the pitch period is calculated using a series of steps that together constitute a three-level center clipping function and which function uses, in part, the determinator 816. In that regard, the sample magnitude sequence determinator 816 compares all of the inputted speech data S(M) with each other to determine a threshold value. The threshold value equals the greatest magnitude of all of the inputted N samples for a particular frame divided by a magnitude of two. After this magnitude of samples is determined, the sequence determinator 816 then compares each of the samples S(M) of the sequence S(N) with this magnitude and generates a Y(n) sequence. For example, if the sample S(i) of the sequence S (N) exceeds the threshold, the variable Y(i) of the sequence Y(N) is set to 1. If the sample S(i) is less than the negative of the threshold, the variable Y(i) is set to −1. If the sample S(i) meets neither of the two above conditions, then Y(i) is set to 0. Using the foregoing steps, the Y(N) sequence is generated and outputted by the sequence determinator 816.

The next step in determining the pitch period involves the use of an autocorrelation function generator 824 that receives the input from the sequence determinator 816. The autocorrelation function generator 824 calculates the autocorrelation of the Y(N) sequence, namely:

$$R(K) = \sum_{M=0}^{N-K-1} Y(n+M)*Y(n+M+K) \quad [10]$$

The R(K) outputs from the function generator 824 are then inputted to pitch detector 832 for determining the pitch period. That is, the pitch detector 832 compares each of the R(K) values in the interval K=25–85 with each other to determine the pitch period. The pitch period K relates to the time or that speech sample from which the voiced speech repeats itself. For example, if the largest value in the interval occurs at R(75), then it is known that the voiced signal repeats itself at each 75 samples of the frame (N samples in a frame). The interval values of 25–85 were found empirically to properly handle the relatively higher pitched voices of women (K=25) and the relatively lower pitched voices of men (K=85).

With regard to the determination of whether voiced or unvoiced audio data is currently being transmitted, the output of the pitch detector 832 is applied to a voiced/unvoiced detector 840. The detector 840 uses the value of R(K) for the pitch period to determine whether or not the speech data is voiced or unvoiced. More specifically, detector 840 compares a determined magnitude with a pre-established value. If the determined magnitude is less than the pre-established value, the current frame of audio data is determined to be unvoiced; otherwise, the current frame is determined to be voiced. In making this calculation, in addition to the R(K) of the pitch period, the detector 840 also receives, as an input, the magnitude R(0). This magnitude is outputted by an autocorrelation function generator 836. The magnitude R(0) represents the energy of the current frame of audio data and is determined by the following autocorrelation equation:

$$R(0) = \sum_{M=0}^{N-1} S(M)*S(M) \quad [11]$$

Where:

S(M)=speech signal samples

N=number of speech samples in the frame The value of the determined R(0) is used by the detector 840 by dividing its value into the magnitude of R(K) of the pitch period. If the result of this division is less than 0.30, it is concluded that the speech frame is unvoiced and if greater than or equal to 0.30, it is concluded that the current frame of audio data is voiced speech data. In the case in which it is voiced speech, the magnitude of the pitch period that was inputted to the voiced/unvoiced detector 840 is outputted to a compressed audio storage memory 842, just as the LPC coefficients A(i) are also inputted to this storage memory 842. As can be understood, no information or data bits need be provided to the memory 842 directed to whether or not the current speech data is voiced or unvoiced since the magnitude of the pitch period provides such information. That is, if the magnitude of the pitch period is other than 0, the speech data is voiced; otherwise, it is unvoiced.

The third speech parameter that is determined in compressing the frame of audio data is the gain associated with that frame. In that regard, a gain factor determinator 844 is provided and which receives inputs from the pitch detector 832 and the audio data storage memory 288. The gain associated with voiced data is the energy in each pitch period. In connection with unvoiced data, it is the energy in each quarter of a frame. Preferably, the maximum number of different gains allowed for each frame having voiced data is 4 in order to meet the preferred bandwidth of 2400 bps for transmission of the audio data. If there are more than 4 pitch periods in a frame of voiced data, a selected number of gains for the greater than 4 pitch periods are transmitted, such as the gain associated with every other pitch period. In determining the gain for voiced frames, the following autocorrelation function is utilized:

$$\text{Gain} = G(K) = \sum_{M=0}^{\text{pitch period}-1} S(M)*S(M) \quad [12]$$

Where:

S(M)=digitized speech signal samples obtained from audio data storage memory 288

Pitch period=the value of K found by determining the largest value of R(K) in the interval K=25–85 and inputted by the pitch detector 832.

In the case in which unvoiced audio data is being transmitted, the output from the pitch detector 840 is used to provide the gain factor determinator 844 with the information that unvoiced speech is being transmitted and the pitch period of equation [12] should be set to 4. The magnitude of the gain outputted by the gain factor determinator 844 is also received by the compressed audio storage memory 842 so that all of the necessary speech parameters of LPC coefficients, pitch period (also contains voiced/unvoiced information) and gain, for a particular frame, are now stored or available for transmission.

Figure 11:
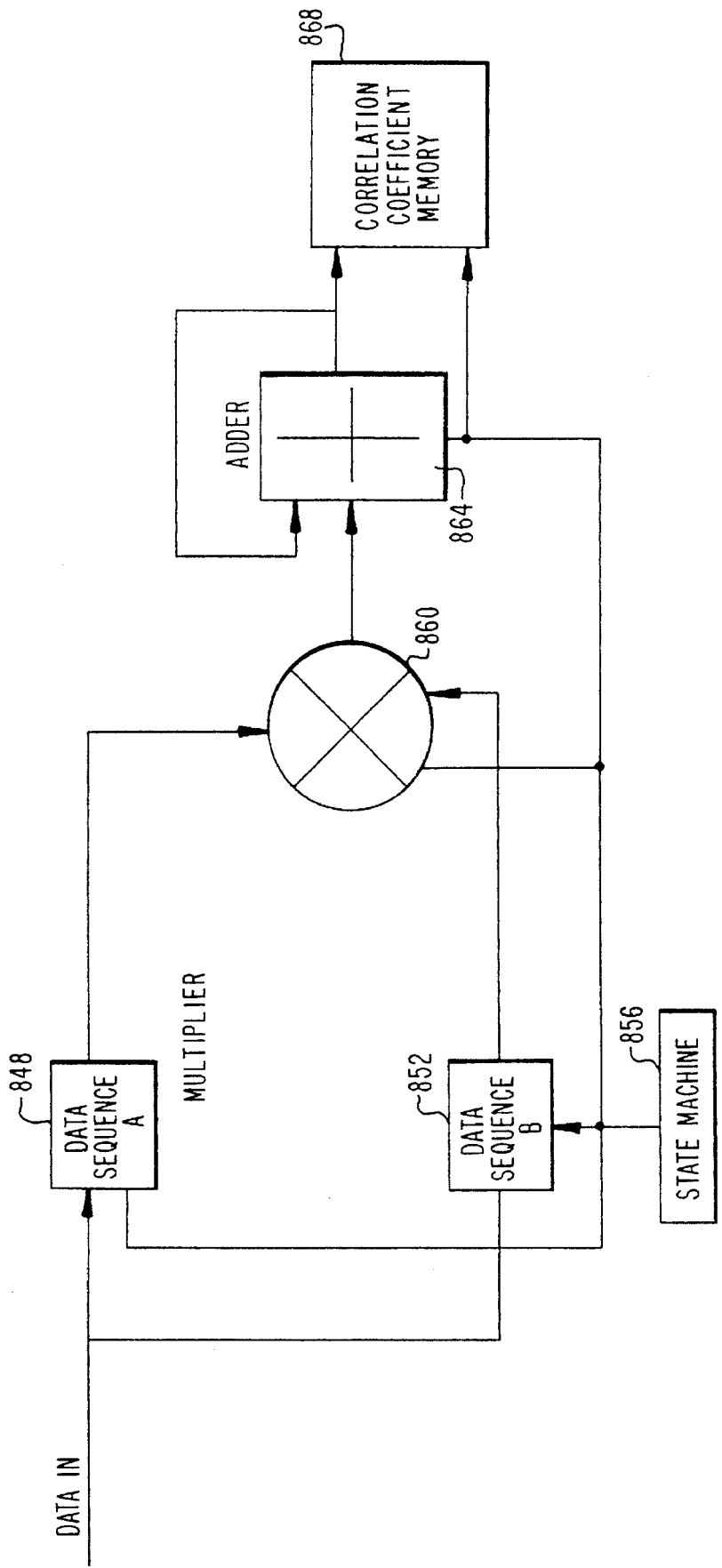
FIG. 11 is a block diagram illustrating a representative autocorrelation function generator used with the LPC coder.

With reference now to FIG. 11, a more detailed schematic representation of the autocorrelation function generators 804, 824, 836 is illustrated. These generators 804, 824, 836 include a data sequence A 848 and a data sequence B 852. Each of the data sequence A 848 and data sequence B 852 receives data to be correlated. In the case of the function generators 804, 836, both data sequences A and B receive sampled speech data S(M). A state machine 856 controls the operation and outputting of the determined values of Rs(i) and R(0), respectively. The outputs from the sequence units are sent to a multiplier 860 that, in accordance with the correlation function of the generator 804, multiplies together the previous and subsequent values of S(M) and S(M+K). In the case of generator 836, current values of S(M) are squared or multiplied together. Continuing with the correlation function, the output of the multiplier 860 is sent to an adder 864 which adds the input and its previous output in accordance with the summing function associated with the function generators 804, 836. The operation of the adder 864 is also controlled by the state machine 856. When the correlation function is completed and the adding operation has performed "p" additions, the state machine 856 causes the output of the adder 864 to be received by a correlation coefficient memory 868, which output corresponds to a Rs(i) or R(0) value. As previously described, the Rs(i) value is inputted to the LPC value is coefficient calculator 808 while the R(0) inputted to the voiced/unvoiced detector 840.

The function generator 824 is also represented schematically by FIG. 11; however, its inputs are the Y(N) function, whose values are determined as previously described. The output of the adder 864 from generator 824 are the R(K) values.

Referring back to FIG. 9, with regard to the transmission of the audio related information stored in the compressed audio storage memory 836, such transmission is controlled by a twenty-second state machine controller 870 and a video and audio data mixer 872. In one embodiment, the mixer 872 is a switch that has two operating states or positions that are under the control of the state machine controller 870. The mixer 872, in a first state, provides a path for audio information to the modulator unit 368. In the second position or state of the switch 870, the video data found in storage memory 244 is able to be transmitted to the mixer 872, to the modulator unit 368 and then to the telephone interface 392, when the LPC system is being utilized. In the case in which no LPC system is employed, and the fast cosine transform is utilized instead, mixed video and audio data is transmitted to the modulator unit 368 from the adaptive differential pulse coder 340, as previously described with reference to FIG. 1. In one embodiment, the mixer 872 is controlled to alternatively pass a video data bit and an audio data bit for each frame of N samples. Because each frame has more video bits than audio bits, after all of the alternated audio bits of a particular frame have been accessed from the memory 842 and sent to the mixer 870, then only remaining video bits associated with that particular frame are accessed and controllably transmitted. The transmission of this composite signal differs from that when the fast cosine transform embodiment is utilized since, in that embodiment, a number of bits that comprise the real number of the complex number having the video and audio data are transmitted together and then the imaginary data having a number of bits is transmitted together. That is, alternating video data (real number) bits and audio data (imaginary number) bits are transmitted.

In the preferred embodiment, data is sent at 9600 bits/second with about 7680 bits being associated with video and audio data. Of the 7680 bits, about 5280 are video bits and about 2400 bits are audio bits. Consequently, a somewhat greater than 2:1 ratio of video bits to audio bits must be controlled asynchronously and yet provide accurately correlated audio and image information at the receiving station. To achieve proper asynchronous operation, it is preferred that all of both the audio data and the video data for each frame (N samples) be sent by the mixer 872 before additional audio and video data is sent under the control of the state machine controller 870. This is accomplished in the above-noted preferred alternating video and audio bit fashion, although other sequencing could be employed. Briefly, qualitatively speaking, it is necessary that the video and audio data be transmitted or "mixed" in a way that permits the video image to be updated at the receiving station without loss or lack of correlation between the video and audio information. In the embodiment in which the video image is updated 7.5 times/second, the audio data must be transmitted to achieve this qualitative purpose and in an asynchronous manner.

Figure 10:
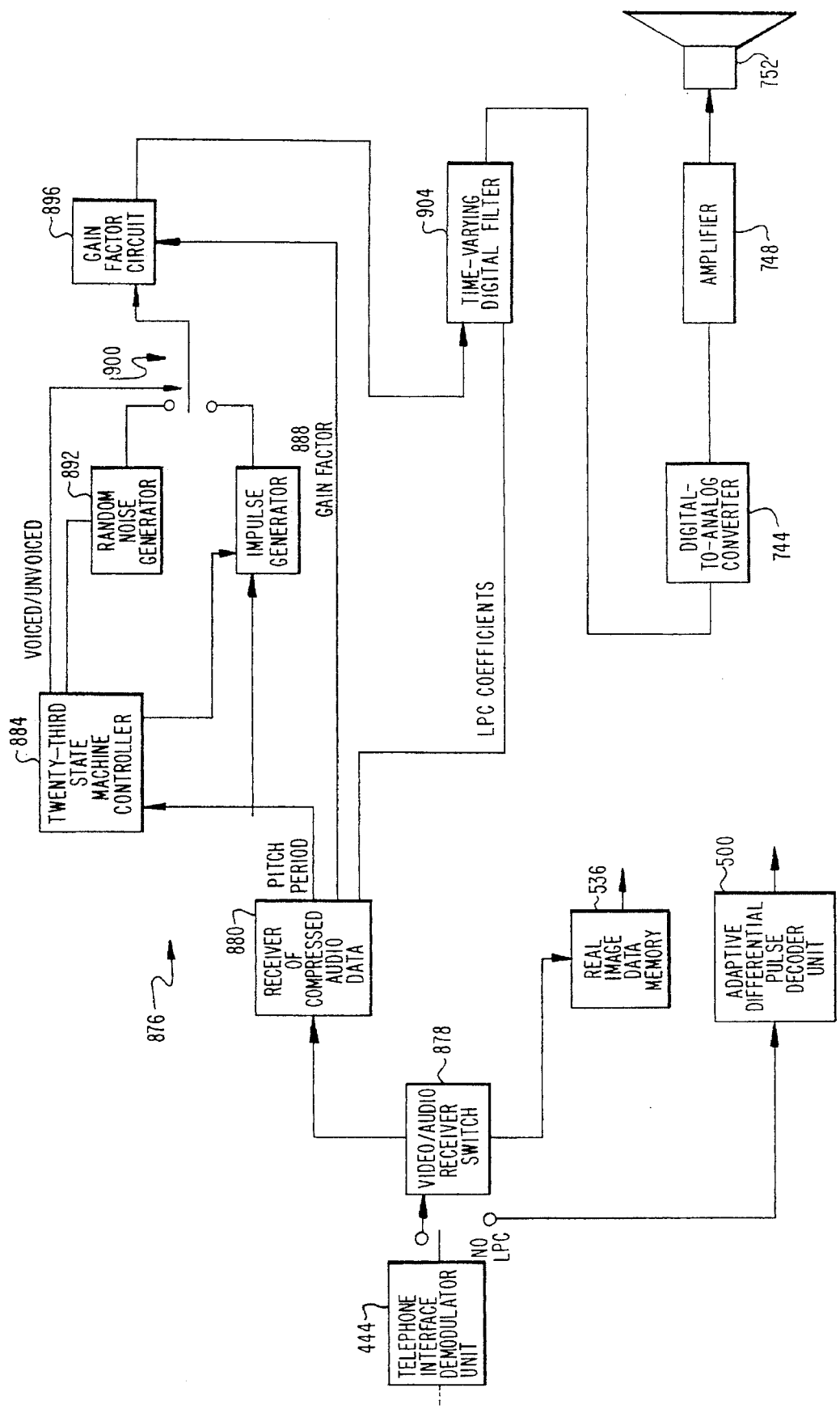
FIG. 10 is a block diagram illustrating a receiving station having a linear predictive coding (LPC) decoder.

Referring now to FIG. 10, the receiving station for receiving the transmitted compressed audio data from the coder 800 is illustrated. Like the previous embodiment, an LPC decoder 876 includes a telephone interface demodulator unit 444. In the embodiment having the LPC system, the output of the demodulator unit 444 is sent through a video/audio receiver switch 878. When the switch 878 is in a first position or state, audio information from the demodulator unit 444 is inputted to a receiver of compressed audio data 880. In conjunction with the N samples of audio data that were compressed by the LPC decoder 800, the receiver 880 receives and then separately outputs each of the three parameters of audio related information that was transmitted, namely: LPC coefficients, the values of the gain factor and the magnitude of the detected pitch period, which also indicates whether the data is voiced or unvoiced.

Figure 2:
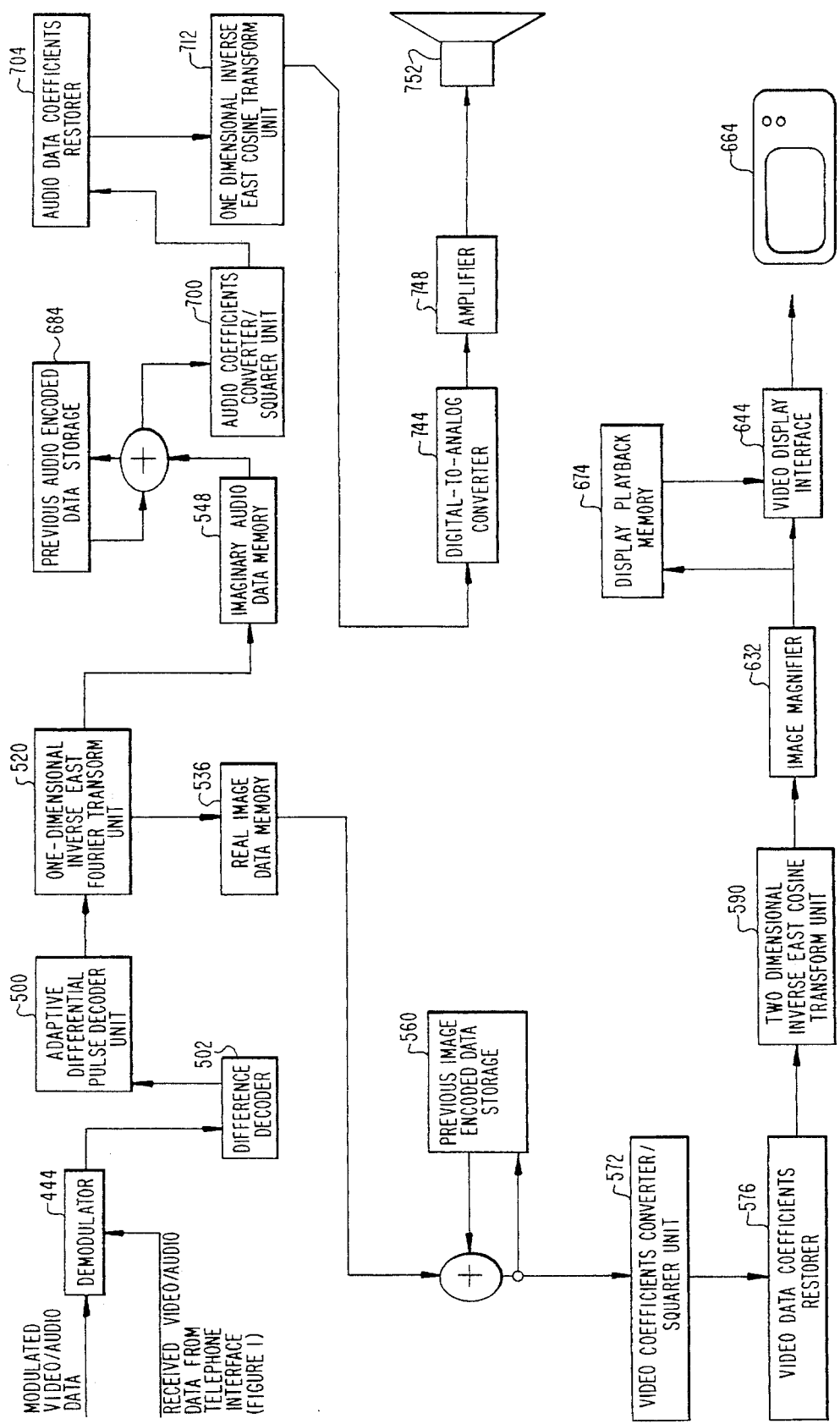
FIG. 2 is a block diagram of the video and audio receiving channels of the video telephone system.

When video information is being outputted by the demodulator unit 444, the switch 878 is in a second position or state whereby the compressed video data is applied to the real image data memory 536 from which it can be processed to decompress the video data in accordance with the illustration and description associated with FIG. 2. In the case in which no LPC system is employed, the entire mixed video/audio data is sent to the adaptive differential pulse decoder unit 500, as also previously described and illustrated in connection with FIG. 2.

With regard to obtaining or "decompressing" audio data using the LPC decoder 876, each of the three outputs from the receiver of compressed audio data 880 is utilized. The magnitude of the pitch period is inputted to a twenty-third state machine controller 884 and an impulse generator 888. The state machine 884 controls the sending of the pitch period magnitude to the impulse generator 888 and also determines whether the data is voiced (pitch period not equal to zero) or unvoiced (pitch period equal to zero) using the inputted value of pitch period. The state machine 884 also controls a random noise generator 892 to cause it to output an a periodic signal when the audio data is unvoiced.

Figure 12:
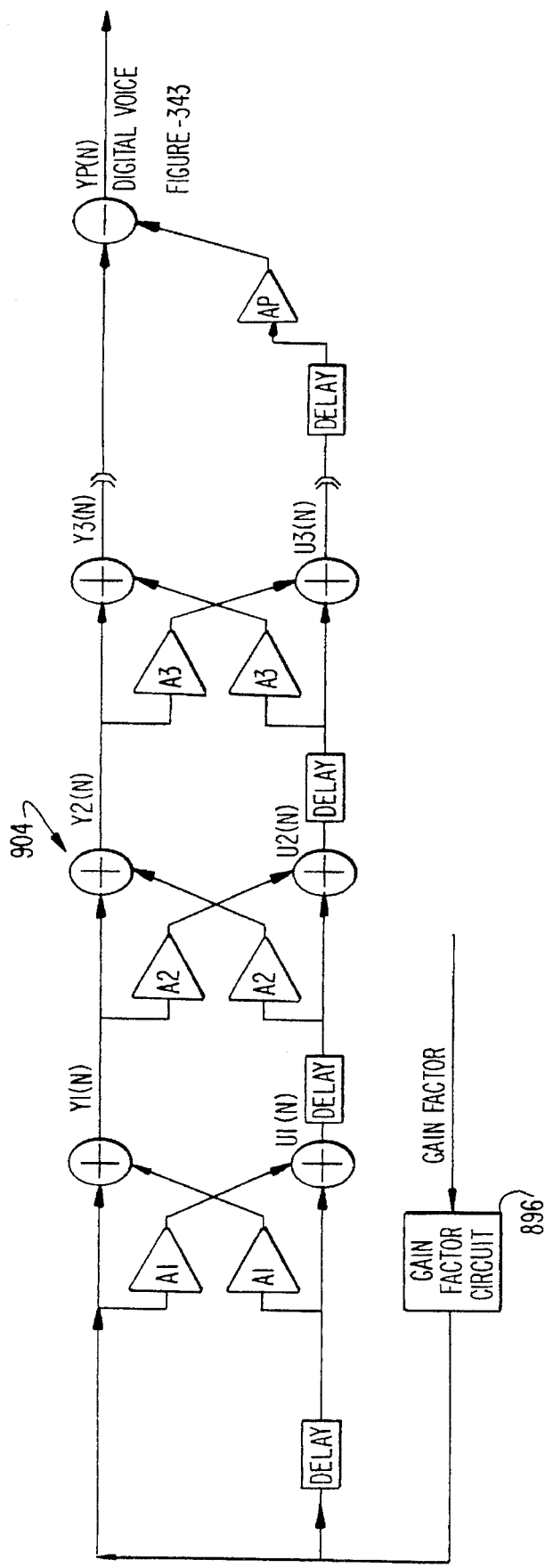
FIG. 12 is a block diagram illustrating details of the time-varying digital filter utilized at the receiving station as part of the LPC decoder.

Depending upon whether or not the current audio data is voiced or unvoiced, the output of one of these two generators 888, 892 is applied to a gain factor circuit 896. The position of unvoiced/voiced switch 900 causes one of the outputs of the random noise generator 892 and impulse generator 888 to be received by the gain factor circuit 896. In a first state or position, the output of the random noise generator 892 is sent to the gain factor circuit 896, while in the second position or state of the switch 900, the output of the impulse generator 888 is sent to the gain factor circuit 896. Control over the state of the switch 900 is provided by an output signal from the state machine 884. Depending upon this state machine 884 output signal, the switch 900 is properly positioned. In the case of unvoiced audio data, the noise generator 892 outputs a sequence of random white noise to the gain factor circuit 896. In contrast, when voiced audio data is being sent, the impulse generator 892 outputs a train of impulses at the corresponding pitch period represented by the magnitude associated with the pitch period signal outputted by the receiver of compressed data audio 880. Regardless of whether it is unvoiced or voiced audio data, the gain factor circuit 896 causes the amplitude of the inputted signal to change to the amplitude determined by the inputted gain factor. The output of the gain factor circuit 896 is inputted to a time-varying digital filter 904, which also receives the signals representative of the predictor coefficients A(i) for the N samples of digitized audio data. The values of the predictor coefficients, together with the gain factor amplitude adjusted noise (unvoiced) or train (voiced), controls the outputting of the decompressed audio data. That is, the filter 904 accurately restores the correlated audio data that had been removed or compressed by the coder 800. FIG. 12 schematically illustrates in greater detail a known time-varying digital filter 904 that includes two channels, each of which receives the current output from the gain factor circuit 896. As represented in FIG. 12, the inputs to the successive stages of one of the channels is delayed over that in the other of the two channels. And, for each of the two channels, the predictor coefficients A(i) act as multipliers for the signal inputted to the particular stage. The outputs from each of the stages, $Y_r(N)$ and $U_r(N)$ are represented by the following equations:

$$y_r(N) = Y_{r-1}(N) + A_r U_{r-1} + (N-1) \qquad [13]$$

$$U_r(N) = U_{r-1}(N) + A_r Y_{r-1}(N-1) \qquad [14]$$

where:

$$Y_1(N) = X_{r-1}(N) + A_1 X(N-1) \qquad [15]$$

$$U_1(N) = A_1 X(N) + X(N-1) \quad [16]$$

and where:

X(N)=output from the gain factor circuit $A_r$=rth predictor coefficient r=1 to p The decompressed digital audio data outputted by the digital filter 904 is then applied to the circuit elements previously described in connection with the embodiment of FIG. 2. That is, the digital-to-analog converter 744 converts the digital audio data to an analog audio signal, which is amplified by the amplifier 748. The output of the amplifier 748 is applied to the audio speaker 752, which reproduces the unvoiced or voiced audio data transmitted by the transmitting station.

In one embodiment that utilizes the LPC decoder system, the audio data is digitized at eight thousand samples/second. The N consecutive samples of the data that are processed are 207 samples. The number of "p" predictor coefficients is 8. From each of the 207 samples of audio data, 6 bits are generated representing the pitch period; 16 bits are generated representing the value of the 4 gain factor values (each gain factor value is represented by 4 bits); 40 bits are generated representing the p=8 five-bit predictor coefficients. A total of 62 bits are transmitted using pulse code modulation by the transmitting station to the receiving station, instead of 1656 bits (207×8 bits/sample) of digitized audio. The use of the LPC system results in the compression of audio data by a factor of about 26.7 (1656/62). As a consequence, audio data, instead of requiring a transmission capacity of 64,000 bits/second (8000 samples/second×8 bits/sample), only requires approximately 2400 bits/second (64,000/26.7) of compressed audio data.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or other embodiments, and with the various modifications required by their particular applications or uses of the invention. It is intended that the appended claims be construed to include alternative embodiments to the extent permitted by the prior art.

What is claimed is:

1. A method for transmitting and receiving video and audio signals over an ordinary telephone line in substantially real time, comprising: generating at a transmitting station a video signal having video information;

generating at said transmitting station an audio signal having audio information; producing a signal wherein said signal includes a mixture of compressed video information and compressed audio information, with said video and audio information being provided to form said signal in a manner that permits accurate restoration thereof at a receiving station and proper synchronization of said video information and said audio information; modulating said signal;

transmitting said signal after said modulating step using an ordinary telephone line having a limited bandwidth in the range of 300–3,400 Hz;

receiving said signal at a receiving station after having been sent over the ordinary telephone line;

demodulating said signal after said receiving step; and reproducing said video information and said audio information at the receiving station using said signal.

2. A method, as claimed in claim 1, wherein: said step of generating a video signal includes providing first means having a number of pixels with said number of pixels together comprising a frame and wherein said video signal is generated using a number of frames with an updating of frames being provided at a rate less than 30 frames per second.

3. A method, as claimed in claim 2, wherein: said video signal is generated using a number of frames with an updating of frames being provided at a rate of about 7.5 frames per second.

4. A method, as claimed in claim 1, wherein: said compressed video information and compressed audio information are provided using at least a first state machine means and ASIC means.

5. A method, as claimed in claim 1, wherein: said step of producing includes compressing said video information and separately compressing said audio information.

6. A method, as claimed in claim 1, wherein: said step of producing includes using a linear predictive coding apparatus to provide compressed audio information.

7. A method, as claimed in claim 6, wherein: said step of producing includes using correlation function generator means for determining at least one of: predictor coefficients, pitch period and gain associated with said audio information.

8. A method, as claimed in claim 7, wherein: said step of producing includes determining a pitch period associated with a predetermined number of samples of said audio information.

9. A method, as claimed in claim 7, wherein: said step of producing includes determining whether said audio information is voiced or unvoiced.

10. A method, as claimed in claim 7, wherein: said step of producing includes determining said gain factor using at least some of said audio information and said pitch period.

11. A method, as claimed in claim 7, wherein: said step of producing includes determining said predictor coefficients using recursively solved equations and correlation function generator means.

12. A method, as claimed in claim 7, wherein: said step of producing includes comparing sampled audio information with a threshold value to generate a sequence of values for use in determining said pitch period.

13. A method, as claimed in claim 7, wherein: said step of producing includes correlating samples of said audio information to provide an output used in determining whether said audio information is voiced or unvoiced.

14. A method, as claimed in claim 1, wherein: said step of producing includes controlling the sending of said compressed audio information and said compressed video information using state machine means.

15. A method, as claimed in claim 1, wherein: said step of transmitting includes using substantially the same bandwidth to send both said video information and said audio information.

16. A method, as claimed in claim 1, wherein: said step of transmitting includes asynchronously sending said modulated composite signal.

17. A method, as claimed in claim 1, wherein: said step of reproducing includes inputting at said receiver station at least one of the following: predictor coefficients, pitch period and gain factor.

18. A method, as claimed in claim 17, wherein: said step of reproducing includes controlling at least one of an impulse generator means and a random noise generator means, depending upon whether said audio information is voiced or unvoiced.

19. A method, as claimed in claim 18, wherein: said step of reproducing includes using at least one of the value of said pitch period and state machine means to control transmission from said impulse generator means and said random noise generator means.

20. A method, as claimed in claim 18, wherein: said step of reproducing includes outputting a train of impulses from said impulse generator means having a pitch period corresponding to said determined pitch period.

21. A method, as claimed in claim 18, wherein: said step or reproducing includes outputting an a periodic signal from said random noise generator means when said audio information is unvoiced.

22. A method, as claimed in claim 18, wherein: said step of reproducing includes inputting an output from one of said impulse generator means and said random noise generator means to gain factor circuit means for controlling the gain associated with an inputted signal.

23. A method, as claimed in claim 22, wherein: said step of reproducing includes inputting said gain factor to said gain factor circuit means.

24. A method, as claimed in claim 17, wherein: said step of reproducing includes inputting said predictor coefficients to time-varying digital filter means and using said predictor coefficients to restore said compressed audio information.

25. An apparatus for substantially simultaneously transmitting and receiving video and audio signals over an ordinary voice grade telephone line, comprising:

first means for generating video information;

second means for generating audio information;

third means for producing compressed video information and compressed audio information for transmission, in substantially real time, over an ordinary voice grade telephone line having a bandwidth in the range of 300–3,400 Hz, and said compressed video information and said compressed audio information being transmitted using the same bandwidth, one of said compressed video information and said compressed audio information being used as real numbers and the other one of said compressed video information and said compressed audio information being used as imaginary numbers, said third means including means for determining a difference between previously transmitted video information and current video information;

fourth means for reproducing video information and audio information from said compressed video information and said compressed audio information after transmission thereof;

fifth means for displaying images using said video information; and sixth means for generating sounds using said audio information.

26. An apparatus, as claimed in claim 25, wherein: said third means includes means for providing a composite signal having said video information and said audio information mixed together in a manner that permits accurate restoration thereof and proper synchronization between said video information and said audio information at a receiving station.

27. An apparatus, as claimed in claim 26, wherein: said third means includes modulator means in which said composite signal is used to modulate a first carrier wave.

28. An apparatus, as claimed in claim 27, wherein: said modulated carrier wave is asynchronously transmitted over the ordinary voice grade telephone line.

29. An apparatus, as claimed in claim 25, wherein: said third means includes means for providing a single data stream of said compressed video information and said compressed audio information wherein both said compressed video information and said compressed audio information are adapted to be transmitted using the same bandwidth over the ordinary voice grade telephone line.

30. An apparatus, as claimed in claim 25, wherein: said third means includes means for correlating samples of said audio information.

31. An apparatus, as claimed in claim 30, wherein: said third means includes predictor coefficient calculator means for receiving outputs from said means for correlating and for determining predictor coefficients associated with said audio information using recursively solved equations.

32. An apparatus, as claimed in claim 25, wherein: said third means includes pitch period detecting means for determining a value of pitch period associated with a predetermined number of samples of said audio information.

33. An apparatus, as claimed in claim 32, wherein: said third means includes means for determining whether said audio information is voiced or unvoiced.

34. An apparatus, as claimed in claim 32, wherein: said third means includes gain factor determinator means for determining a gain factor associated with said audio information.

35. An apparatus, as claimed in claim 25, wherein: said third means includes a linear predictive coding apparatus that includes a linear predictive coding coder and a linear predictive coding decoder.

36. An apparatus, as claimed in claim 35, wherein: said linear predictive coding decoder includes impulse generator means for receiving a value of pitch period associated with audio information for outputting an impulse train having a pitch period corresponding to said pitch period value.

37. An apparatus, as claimed in claim 35, wherein: said linear predictive coding decoder includes random noise generator means for outputting a substantially a periodic signal when unvoiced audio information is being receiving by said decoder.

38. An apparatus, as claimed in claim 35, wherein: said linear predictive coding decoder includes gain factor circuit means for receiving a magnitude of gain factor and outputting a digital signal having a waveform dependent upon whether audio information is voiced or unvoiced and an amplitude depending upon the magnitude of said gain factor.

39. An apparatus, as claimed in claim 35, wherein: said linear predictive coding decoder includes time-varying filter digital means for receiving predictor coefficients and for outputting synthesized audio information that substantially represents said audio information generated by said second means.

* * * * *